United States Patent
Siess et al.

(10) Patent No.: US 12,510,409 B2
(45) Date of Patent: Dec. 30, 2025

(54) MULTICHANNEL COLOR SENSOR

(71) Applicant: ams Sensors Germany GmbH, Jena (DE)

(72) Inventors: Gunter Siess, Jena (DE); Julius Komma, Kraftsdorf (DE)

(73) Assignee: AMS SENSORS GERMANY GMBH, Jena (DE)

( * ) Notice: Subject to any disclaimer, the term of this patent is extended or adjusted under 35 U.S.C. 154(b) by 58 days.

(21) Appl. No.: 17/912,158

(22) PCT Filed: Mar. 18, 2021

(86) PCT No.: PCT/EP2021/056981
§ 371 (c)(1),
(2) Date: Sep. 16, 2022

(87) PCT Pub. No.: WO2021/185979
PCT Pub. Date: Sep. 23, 2021

(65) Prior Publication Data
US 2023/0184589 A1  Jun. 15, 2023

Related U.S. Application Data

(60) Provisional application No. 62/992,048, filed on Mar. 19, 2020.

(30) Foreign Application Priority Data

Jun. 22, 2020  (GB) ...................................... 2009504
Dec. 14, 2020  (GB) ...................................... 2019683

(51) Int. Cl.
*G01J 3/28*  (2006.01)
*G01J 3/36*  (2006.01)
(Continued)

(52) U.S. Cl.
CPC ............... *G01J 3/2823* (2013.01); *G01J 3/36* (2013.01); *G01J 3/51* (2013.01); *G01J 3/524* (2013.01); *G01J 2003/1213* (2013.01)

(58) Field of Classification Search
CPC ............ G01J 1/4204; G01J 2003/1213; G01J 2003/1226; G01J 3/2823; G01J 3/36;
(Continued)

(56) References Cited

U.S. PATENT DOCUMENTS

2015/0092071 A1  4/2015  Meng et al.
2016/0232828 A1  8/2016  Jia et al.

FOREIGN PATENT DOCUMENTS

DE  102015122835 A1  6/2017
EP     0491131 A1   6/1992
(Continued)

OTHER PUBLICATIONS

Haan, Martine (EP Authorized Officer), International Search Report and Written Opinion in corresponding International Application No. PCT/EP2021/056981 mailed on Jun. 25, 2021, 14 pages.
(Continued)

*Primary Examiner* — Tri T Ton
(74) *Attorney, Agent, or Firm* — MH2 Technology Law Group LLP

(57) ABSTRACT

An integrated radiation sensor for color matching functions comprises a plurality of color matching channels, each color matching channel comprising a radiation sensing element and an associated optical filter defining a spectral sensitivity profile corresponding to a color matching function. The sensors comprise a plurality of compensation channels, each compensation channel comprising a radiation sensing element and an associated optical filter defining a spectral sensitivity profile for use in compensating a color sensed by the color matching channels. The spectral sensitivity profile of each compensation channel substantially corresponds to a mean of an upper deviation spectra and a lower deviation spectra, wherein the upper deviation spectra corresponds to a spectral sensitivity profile of a typical color matching
(Continued)

channel increased by a fixed deviation in wavelength and the lower deviation spectra corresponds to the spectral sensitivity profile of the typical color matching channel decreased by the fixed deviation in wavelength.

20 Claims, 34 Drawing Sheets

(51) Int. Cl.
    *G01J 3/51*     (2006.01)
    *G01J 3/52*     (2006.01)
    *G01J 3/12*     (2006.01)

(58) Field of Classification Search
    CPC .. G01J 3/463; G01J 3/465; G01J 3/506; G01J 3/51; G01J 3/513; G01J 3/524
    See application file for complete search history.

(56) References Cited

FOREIGN PATENT DOCUMENTS

| | | | |
|---|---|---|---|
| EP | 1521069 | A2 | 4/2005 |
| EP | 3021096 | A1 | 5/2016 |
| EP | 3447756 | A1 * | 2/2019 |
| GB | 2456771 | A | 7/2009 |
| JP | 2018164153 | A * | 10/2018 |
| WO | 2020094587 | A1 | 5/2020 |

OTHER PUBLICATIONS

Wittmann-Regis, Agnes (IB Authorized Officer), International Preliminary Report on Patentability in corresponding International Application No. PCT/EP2021/056981 mailed on Sep. 29, 2022, 11 pages.

Monno et al., "A Practical One-Shot Multispectral Imaging System Using a Single Image Sensor," IEEE Transactions on Image Processing, vol. 24, No. 10, Oct. 2015, First published May 21, 2015, 12 pages.

German Office Action issued in corresponding German Patent Application No. 11 2021 001 719.5, dated Feb. 10, 2025, with English Language Translation, 10 pages.

Chinese Office Action issued in corresponding Chinese Patent Application No. 202180022324.3, dated Mar. 8, 2025, with English Language Translation, 18 pages.

Chinese Office Action Issued In Corresponding Chinese Patent Application No. 2021800223243 Dated Jul. 22, 2025, with English Language Translation, 14 pages.

Great Britain Search Report issued in corresponding Great Britain Patent Application No. 2019683.8 dated May 19, 2021, 4 pages.

* cited by examiner

MULTICHANNEL COLOR SENSOR

CROSS-REFERENCE TO RELATED APPLICATIONS

The present application is the national stage entry of International Patent Application No. PCT/EP2021/056981, filed on Mar. 18, 2021, and published as WO 2021/185979 A1 on Sep. 23, 2021, which claims the benefit of U.S. Provisional Patent Application No. 62/992,048 filed Mar. 19, 2020, Great Britain Application No. 2009504.8, filed on Jun. 22, 2020, and Great Britain Application No. 2019683.8, filed on Dec. 14, 2020, all of which are incorporated by reference herein in their entireties.

TECHNICAL FIELD OF THE DISCLOSURE

The present disclosure is in the field of integrated radiation sensors, such as multi-spectral sensors for ambient light sensing or colorimetric applications.

BACKGROUND OF THE DISCLOSURE

Radiation sensors, such as multi-spectral sensors used as ambient light sensors or XYZ sensors used for colorimetric applications, may comprise spectral filters for the implementation of application-specific spectral sensitivity functions.

Spectral filters may be implemented as, for example, interference filters formed from multiple thin layers of dielectric material having different refractive indices. Such interference filters may be deposited on a radiation-sensitive element to form a radiation sensor with a defined spectral sensitivity profile.

The filters, and indeed the radiation-sensitive element and components of an optical system in which the radiation sensor may be implemented, may be subject to manufacturing process related tolerances, which may affect a spectral sensitivity profile of the sensor.

In particular, variations in layer thickness of the individual layers of the interference filters due to manufacturing process tolerances may result in a spectral shift of a spectral sensitivity profile of the sensor. Also, variations in an angular distribution of incident radiation because of tolerances in an optical system may also result in a shift in a spectral sensitivity profile of the sensor. Depending on factors which may include the layer-thickness variation of the interference filter and/or the amount of interference layers in the filer, typical spectral shifts can be in the region of +/−1% of wavelength.

Some target applications, such as color sensing applications, are particularly sensitive to spectral variation caused by manufacturing process tolerances. For example, color sensors implementing a standard spectral value function according to CIE (International Commission on Illumination) are dependent on the highly accurate simulation of a spectral target function.

It is therefore desirable to be able to provide a sensor that has limited susceptibility to variances in spectral response to manufacturing process tolerance, and/or to have a means to compensate for such tolerances.

It is therefore an aim of at least one embodiment of at least one aspect of the present disclosure to obviate or at least mitigate at least one of the above identified shortcomings of the prior art.

SUMMARY

The present disclosure relates to an integrated radiation sensor suitable use in for color matching functions, and also for use in spectral reconstruction applications. The present disclosure also relates to an electronic device, such as a cellular telephone, comprising the integrated radiation sensor.

According to a first aspect of the present disclosure, there is provided an integrated radiation sensor for color matching functions. The sensor comprises a plurality of color matching channels, each color matching channel comprising a radiation sensing element and an associated optical filter defining a spectral sensitivity profile corresponding to a color matching function.

The sensor comprises a plurality of compensation channels, each compensation channel comprising a radiation sensing element and an associated optical filter defining a spectral sensitivity profile for use in compensating a color sensed by the color matching channels.

The spectral sensitivity profile of each compensation channel substantially corresponds to a mean of an upper deviation spectra and a lower deviation spectra, wherein the upper deviation spectra corresponds to a spectral sensitivity profile of a typical color matching channel increased by a fixed deviation in wavelength and the lower deviation spectra corresponds to the spectral sensitivity profile of the typical color matching channel decreased by the fixed deviation in wavelength.

Beneficially, the disclosed integrated radiation sensor may be used to implement color matching functions, wherein tolerances of manufacturing processes of optical system components, such as optical filters may be compensated. As such, the disclosed integrated radiation sensor may be optimized for CIE XYZ standard observer color matching functions.

Furthermore, by providing a combination of channels with spectral sensitivity profiles optimized for color matching functions, along with a plurality of compensation channels with spectral sensitivity profiles substantially interspersed between the spectral sensitivity profiles of the color matching channels, the integrated radiation sensor may be suitable for use in spectral reconstruction applications.

The fixed deviation in wavelength may be +/−1%.

It will be appreciated that in other embodiments the fixed deviation in wavelength may be greater than or less than +/−1%, for example +/−0.5%, +/−0.75%, +/−1.25%, +/−1.5%, or the like The compensation channels may comprise spectral sensitivity profiles substantially conforming to a Gaussian or Cosine shape.

Beneficially, by adhering to a substantially Gaussian or Cosine shape, a process of design and production of the optical filters associated with each compensation channel may be simplified.

In some embodiments a spectral sensitivity profile of at least one of a plurality of compensation channels may comprise a substantially Gaussian or Cosine spectral sensitivity profile.

The spectral sensitivity profile of each color matching channel may corresponds to a component of a CIE (International Commission on Illumination) standard observer color matching function.

For example, the CIE standard observer color matching function may be the CIE 1931 2° Standard Observer or the CIE 1964 10° Standard Observer.

The spectral sensitivity profile of each color matching channel may correspond to a component of a CIE XYZ color space.

For example, the spectral sensitivity a color matching channel may correspond to one of the "X", "Y", or "Z"

tristimulus values. In a particular embodiment, the integrated radiation sensor may comprise three color matching channels, corresponding to the "X", "Y", or "Z" tristimulus values of the CIE standard observer color matching function.

The spectral sensitivity profiles of the plurality of channels may collectively span substantially all of the visible range of the electromagnetic spectrum.

That is, a substantial portion of the spectral sensitivity profiles of channels with adjacent peak sensitivities may overlap. In an example embodiment, the Full-Width-at-Half-Maximum (FWMH) and/or the peak wavelength of each channel may be configured such that a spectral sensitivity profiles of the channels substantially overlap.

Beneficially, this enables the integrated radiation sensor to be particularly useful for spectral reconstruction applications of visible radiation, in addition to colorimetric applications.

The integrated radiation sensor may comprise at least one further channel having a spectral sensitivity profile in a visible range of the electromagnetic spectrum.

Beneficially, by providing one or more further channels in addition to the color matching channels and the compensation channels, a suitability of the integrated radiation sensor for spectral reconstruction applications may be enhanced.

The integrated radiation sensor may comprise at least one further channel having a spectral sensitivity profile at least partly in an infrared range of the electromagnetic spectrum.

The infrared range may be a near infrared (NIR) range. Beneficially, by providing at least one further channel in an infrared range, the integrated radiation sensor may be suitable for spectral reconstruction applications extending from the visible spectrum into the infrared range of the electromagnetic spectrum.

The integrated radiation sensor of any preceding claim may comprise at least one further channel having a spectral sensitivity profile in an ultraviolet range of the electromagnetic spectrum.

Beneficially, by providing at least one further channel in an ultraviolet range, the integrated radiation sensor may be suitable for spectral reconstruction applications extending from the visible spectrum into the ultraviolet range of the electromagnetic spectrum The integrated radiation sensor may comprise at least three color matching channels and at least 4 compensation channels. For example, the at least three color matching channels may correspond to X, Y and Z tristimulus values. In an embodiment, at least one color matching channel may correspond to a portion of a tristimulus value. For example, a color matching channel may correspond to a long wavelength portion of the X tristimulus value.

Beneficially, such a configuration may provide an integrated radiation sensor with adequate compensation of a spectral deviation of the spectral sensitivity of the color channels that may be due to manufacturing process related tolerances. Furthermore, the provision of a total of seven channels enables the integrated radiation sensor to be suitable for spectral reconstruction applications, due at least in part to a substantial portion of an electromagnetic range e.g. the visible range, being covered by the seven channels.

The compensation channels of the integrated radiation sensor may comprise spectral sensitivity profiles having a peak wavelength and/or FWMH that is substantially different from a peak wavelength and/or FWMH of the spectral sensitivity profile of any of the color matching channels.

That is, compensation channels may be configured to have spectral sensitivity profiles with peaks and/or FWHM (Full Width at Half Maximum) that are interspersed between peaks and/or FWHM of spectral sensitivity profiles of color matching channels, thus ensuring that a continuum of the electromagnetic spectrum can be sensed by the integrated radiation sensor.

The integrated radiation sensor may be configured such that an extent of an overlap between spectral sensitivity profiles of channels is limited. This may, for example, ensure a sufficient range of the electromagnetic spectrum can be sensed with adequate sensitivity, while also optimizing characteristics such as peak wavelength and FWHM of the spectral sensitivity profiles of compensation channels for purposes of providing compensation to the color matching channels.

Furthermore, this beneficially enables the integrated radiation sensor to be suited toward both color matching functions and spectral reconstruction applications.

By means of example, when designing the integrated radiation sensor for an XYZ color matching function, and in particular when configuring a spectral sensitivity of each optical filter, the following steps may be performed.

A spectral deviation from a spectral sensitivity profiles of a typical XYZ sensor channel may be determined. In one example, an upper deviation spectra may be determined by increasing a wavelength of the spectral sensitivity profiles of a channel by a fixed deviation of +1%. Similarly, a lower deviation spectra may be determined by decreasing a wavelength of the spectral sensitivity profiles of a channel by a fixed deviation of −1%.

The upper and lower deviation spectra are added together to form a compensation spectra. Alternatively, a mean of the upper and lower deviation spectra may be determined, to form the compensation spectra. In a further optional step, peaks of the compensation spectra may be individually normalized. That is, the compensation spectra, which may comprise a plurality of peaks and troughs, may be separated into individual spectra defined by the peaks and troughs. Each individual peak may then normalized, thus defining a spectral sensitivity of a candidate compensation channel.

For example, applying the above process to the CIE XYZ standard observer color matching functions would result in 8 candidate compensation channels, corresponding to upper and lower flanks of the spectral sensitivity of each of an ideal or typical X (upper and lower peak), Y and Z tristimulus values. However, several of the candidate channels would comprise spectral sensitivities that directly, or substantially overlap a spectral sensitivity of a typical or ideal X, Y or Z color channel. Thus, in order to avoid excessive and/or unnecessary use of channels, it may be preferred in some embodiments to implement an integrated radiation sensor comprising only compensation channels that exhibit spectral sensitivities that substantially differ in peak wavelength and/or FWMH from a peak wavelength and/or FWMH of the spectral sensitivity profile of any of the color matching channels. For example, peaks of the spectral sensitivity profiles of channels may be separated by a minimum of 10 nm, 15 nm, 20 nm or more.

In a particular embodiment, an integrated radiation sensor may comprise three color matching channels corresponding to typical or ideal X, Y and Z values of the CIE XYZ standard observer color matching function. The embodiment may also comprise four compensation channels. A first compensation channel may correspond to a compensation spectra defined by a lower flank of the spectral sensitivity of a lower peak of the typical or ideal Z channel. A second compensation channel may correspond to a compensation spectra defined by an upper flank of the spectral sensitivity of a lower peak of the typical or ideal Z channel. A third compensation channel may correspond to a compensation spectra defined by a lower flank of the spectral sensitivity of the typical or ideal Y channel. A fourth compensation channel may correspond to a compensation spectra defined by an upper flank of the spectral sensitivity of the typical or ideal X channel.

In another embodiment, additional channels may be added to ensure sensitivity of the integrated radiation sensor over the complete visible range and/or at least part of the infrared range and/or at least part of the ultraviolet range or the electromagnetic spectrum.

In an embodiment, a further channel may be added with a spectral sensitivity peak having a relatively short wavelength compared to the spectral sensitivity peak of the color channels. For example, a peak of sensitivity spectrum the further channel may be approximately 410 nm, and a FWHM of the peak may extend below 400 nm, into the ultraviolet range of the electromagnetic spectrum.

Similarly, the embodiment may comprise two further channels having a spectral sensitivity peak having a relatively long wavelength compared to the spectral sensitivity peak of the color channels. For example, peaks of sensitivity spectrum of the further channels may be approximately 630 nm and 720 nm, thus extending into the infrared range of the electromagnetic spectrum.

The spectral sensitivity profile of a typical color matching channel may correspond to a spectral sensitivity profile of an ideal color matching channel.

That is, for example, in the above described process of designing the integrated radiation sensor, the spectral sensitivity of the typical color matching channel may substantially, or exactly, correspond to the CIE 1931 2° Standard Observer or the CIE 1964 10° Standard Observer.

The integrated radiation sensor may comprise a further channel, wherein the further channel may comprise a radiation-sensing element and an associated optical filter having a passband corresponding to a peak in an emission spectrum of mercury in the visible light range.

The passband may be centered at approximately 545 nanometers.

Advantageously, a passband centered at approximately 545 nanometers is particularly suited to detection of radiation corresponding to emission from a fluorescent light source. For example, narrowband emission spectra corresponding to mercury in a fluorescent light source may be centered at approximately 545 nanometers.

The passband may have a width of approximately 10 nanometers.

Advantageously, a passband width of approximately 10 nanometers may enable the passband to overlap a narrowband emission spectra centered at approximately 545 nanometers, taking into account any process variations of the filter.

According to a second aspect of the present disclosure, there is provided an electronic device comprising: a display that displays images for a user; an integrated radiation sensor according to the first aspect; and control circuitry coupled to the display and the integrated radiation sensor, wherein the control circuitry is configured to determine a color of light incident upon the radiation sensor based upon at least one signal from the integrated radiation sensor, and wherein the control circuitry is configured to adjust the display based at least in part on a determined color.

In one example embodiment, the control circuitry may be configured to provide Automatic White Balancing (AWB) to the display, based on a sensed radiation.

The electronic device may comprising a memory storing a calibration matrix for calibrating data corresponding radiation sensed by the integrated radiation sensor. The memory may be a local memory, such as a volatile or non-volatile memory integrated into the sensor, or a package comprising the sensor, or otherwise communicably coupled to the sensor.

The electronic device may be one of: a cellular telephone, a camera, an image-recording device; and/or a video recording device.

According to a third aspect of the present disclosure there is provided a method of calibrating the integrated radiation sensor of the first aspect, the method comprising: exposing the sensor to incident radiation from a known source of radiation; generating a sensitivity matrix corresponding to the incident radiation sensed by each of the plurality of channels of the sensor; and generating and storing a calibration matrix corresponding to the sensitivity matrix adapted for a color matching function.

The step of exposing the sensor to radiation comprises performing a monochromatic sweep test, and/or exposing the sensor to multiple light sources According to a fourth aspect of the present disclosure, there is provide a use of the integrated sensor of according to the first aspect for spectral reconstruction and/or for a color matching function and/or for detection of a fluorescent light source.

The integrated radiation sensor may comprise an integrated circuit formed on a silicon substrate. The integrated radiation sensor may comprise circuitry, such as analog and/or digital circuitry, for processing the electrical signals corresponding to radiation sensed by the radiation sensitive elements. The integrated radiation sensor may comprise a storage device, such as a volatile or non-volatile memory device. The storage device may be configured to store calibration data, as described below in more detail. The integrated radiation sensor may be formed as a monolithic device. The integrated radiation sensor may be formed from a plurality of discrete devices mounted on a substrate or an interposer.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF THE PREFERRED EMBODIMENTS

These and other aspects of the present disclosure will now be described, by way of example only, with reference to the accompanying drawings, which are:

FIG. 1 a graph depicting CIE and XYZ sensor tolerance by filter process;

FIG. 2 a graph depicting a spectra deviation model of XYZ sensor to CIE with no calibration;

FIG. 3 a graph depicting an analysis of spectral deviation of FIG. 2;

FIG. 4 a graph depicting a spectra deviation model of XYZ sensor to CIE with individual best-fit calibration;

FIG. 5 a graph depicting an analysis of spectral deviation of FIG. 4;

FIG. 6 a graph depicting sensitivity spectra of an XYZ sensor;

FIG. 7 a graph depicting a spectra deviation of the sensitivity spectra of FIG. 6;

FIG. 8 compensation spectra derived from the spectra deviation of FIG. 7;

FIG. 9 normalized compensation spectra and XYZ sensor sensitivity spectra of FIG. 6;

FIG. 10 a graph depicting sensitivity spectra of an XIYZ sensor;

FIG. 11 a graph depicting a spectra deviation of the sensitivity spectra of FIG. 10;

FIG. 12 compensation spectra derived from the spectra deviation of FIG. 11;

FIG. 13 normalized compensation spectra and XYZ sensor sensitivity spectra of FIG. 10;

FIG. 14 an example of a sensor sensitivity spectra;

FIG. 15 a further example of a sensor sensitivity spectra;

FIG. 16 a graph depicting a spectra deviation model of XYZ sensor to CIE with best-fit calibration according to an embodiment of the present disclosure;

FIG. 17 a graph depicting an analysis of spectral deviation of FIG. 16;

FIG. 18 a graph depicting compensation channels with a substantially Gaussian-like spectral response;

FIG. 19 an electronic device according to an embodiment of the disclosure;

FIG. 20 a method of calibrating an integrated radiation sensor according to an embodiment of the disclosure;

DETAILED DESCRIPTION OF THE PREFERRED EMBODIMENTS

This disclosure describes the design, implementation and use of an integrated radiation sensor. The disclosed integrated radiation sensor operates as a color sensor and as a spectral sensor. The disclosed integrated radiation sensor comprises color matching function channels, hereinafter referred to as 'color matching channels'. The disclosed integrated radiation sensor also comprises additional channels to compensate for spectral variations, hereinafter referred to a 'compensation channels'. Such spectral variations may, for example, be based on tolerances in components of an optical system in which the integrated radiation sensor is present. Such spectral variations may, for example, be based on filter process tolerances to optimize a fit to the CIE XYZ standard observer color matching functions. As described in more detail below, a profile of a spectral sensitivity of compensation channels may be generated by an expected filter shift and a spectral deviation to the CIE XYZ standard observer color matching functions. With knowledge of an actual spectral sensitivity, compensation may be performed for each individual sensor or sensor system using an optimized [n×3] conversion matrix operation of the n sensor signals into CIE XYZ values. In parallel, or alternatively, the color matching channels and the compensation channels may be used for spectra reconstruction.

Typical use cases of the disclosed integrated radiation sensor may include, for example, ambient light sensing (ALS) in mobile devices such as cellular telephones. Such mobile devices may implement light source detection to provide, for example, AWB for a camera, or for adjusting a display. Further use cases may include stand-alone devices installed indoors or outdoors, which may implement ALS and/or color calibration of color light sources in the vicinity of the stand-alone device, e.g. a projector, a display, or the like.

A requirement of ALS is to detect color coordinates with a relatively high degree of accuracy. A sensor for ALS, e.g. the disclosed integrated radiation sensor, may comprise a plurality of channels. Each channel may have an associated interference filter, which may be configured to have a sensitivity corresponding to the CIE XYZ standard observer color matching functions. Based on variations, such as manufacturing variations in the interference filters and/or optical setup in a system employing such interference filters, a final spectral sensitivity may vary. Such spectral variations may correspond to a range of +/−1% of the wavelength.

Figure 1:
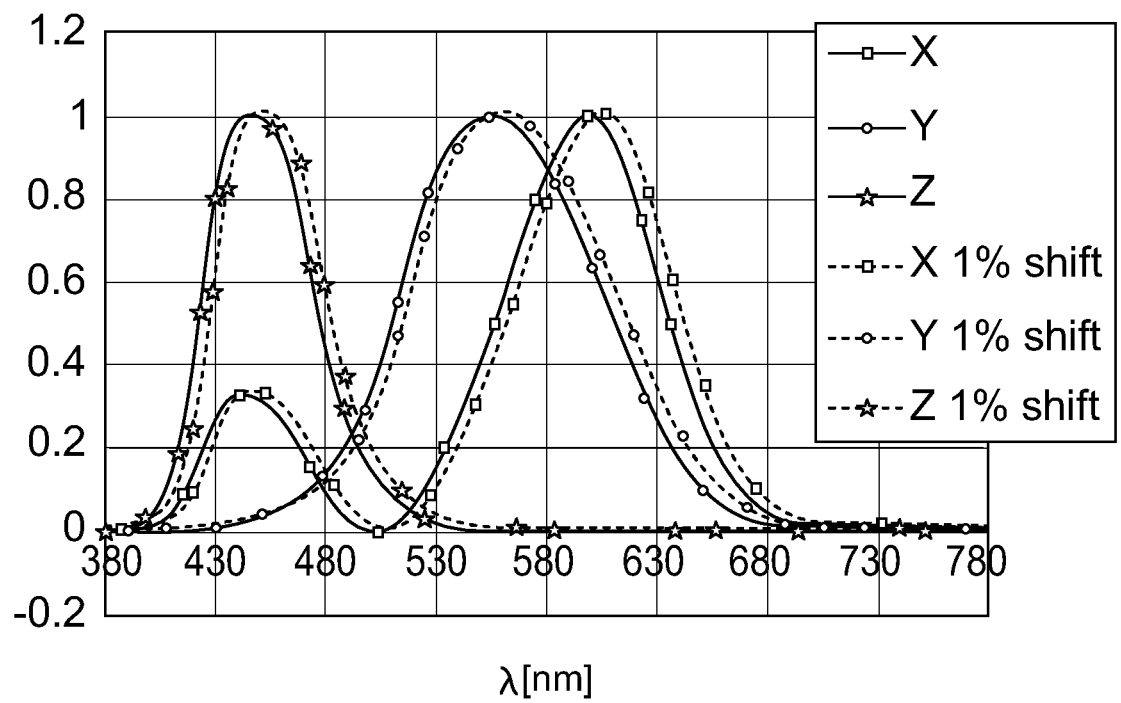

For example, FIG. 1 depicts spectra corresponding to the X, Y and Z components of the CIE color space. The examples in FIG. 1 depict the X, Y and Z spectra shifted by +1%. Such a shift may have a significant influence on an accuracy of color coordinates measured by the integrated radiation sensor. Such a shift may be most significant for radiation with narrow-band components located in the flanks of the spectra, for example radiation from fluorescent lighting or from LEDs. By having a calibration to a best-fit of the real sensor sensitivity to the target function, e.g. the CIE XYZ target function by a [3×3] matrix, it is not possible to compensate all spectral deviations. This is depicted in FIGS. 2 to 5 and described in more detail below.

Furthermore, for light source detection it is also preferred to have multi-channel information over at least the visible spectrum (VIS) for performing spectral reconstruction of the light source for further analysis. The disclosed integrated radiation sensor, which comprises a combination of color matching channels and compensation channels, supports both light source detection for performing spectral reconstruction of the light source for further analysis, and also color matching functions.

FIGS. 2 to 5 depict a simulation of worst-case combinations of +/−1% filter shift and an applied best-fit compensation to the CIE XYZ standard observer color matching functions, and an analysis of spectral deviation F1.

Figure 2:
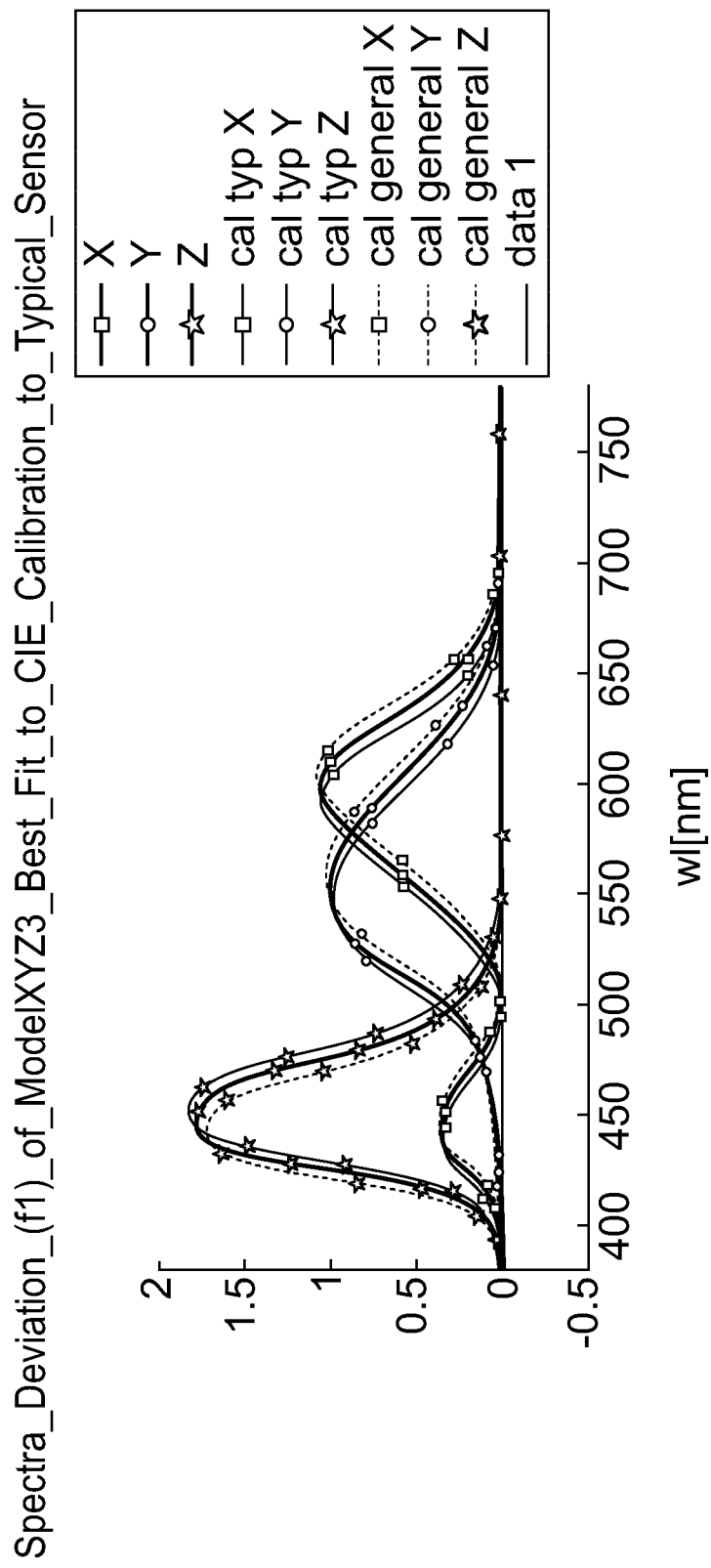
Figure 3:
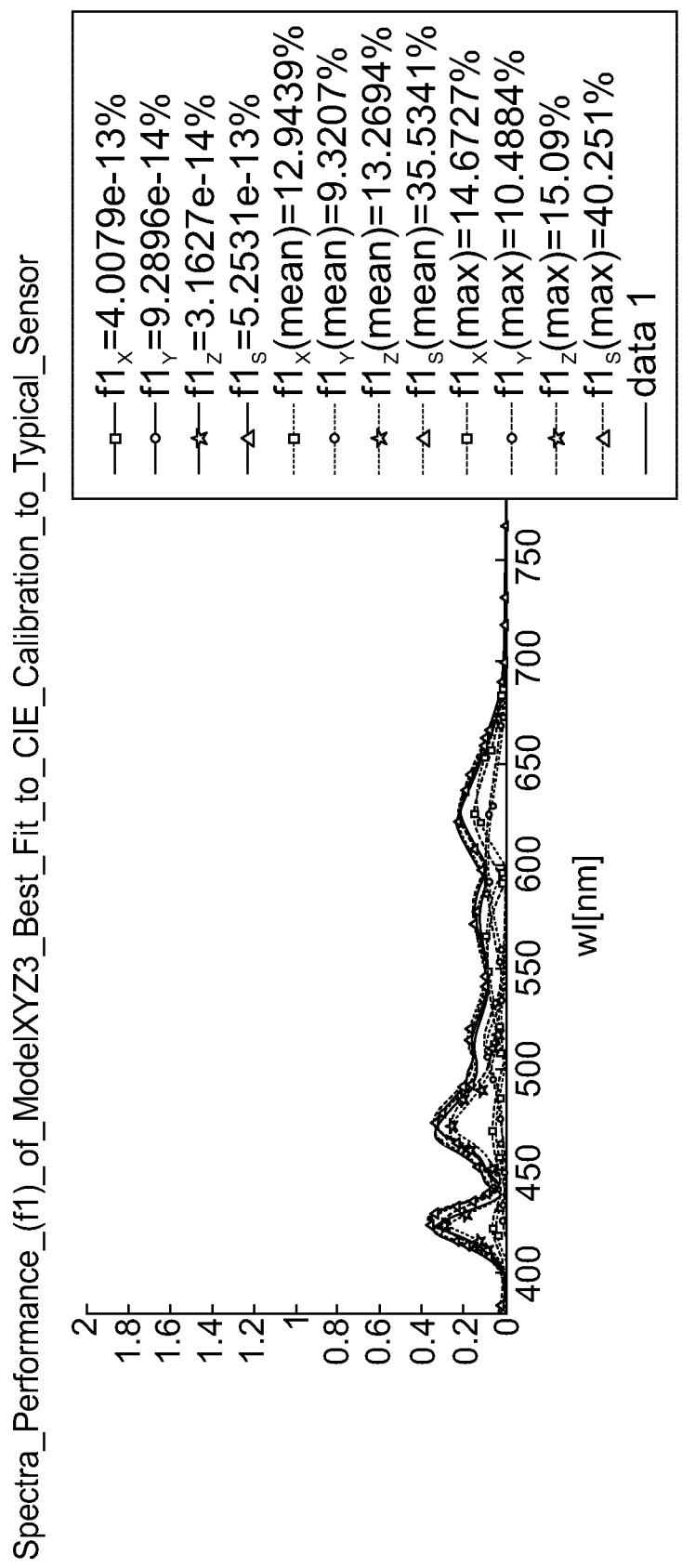
Figure 4:
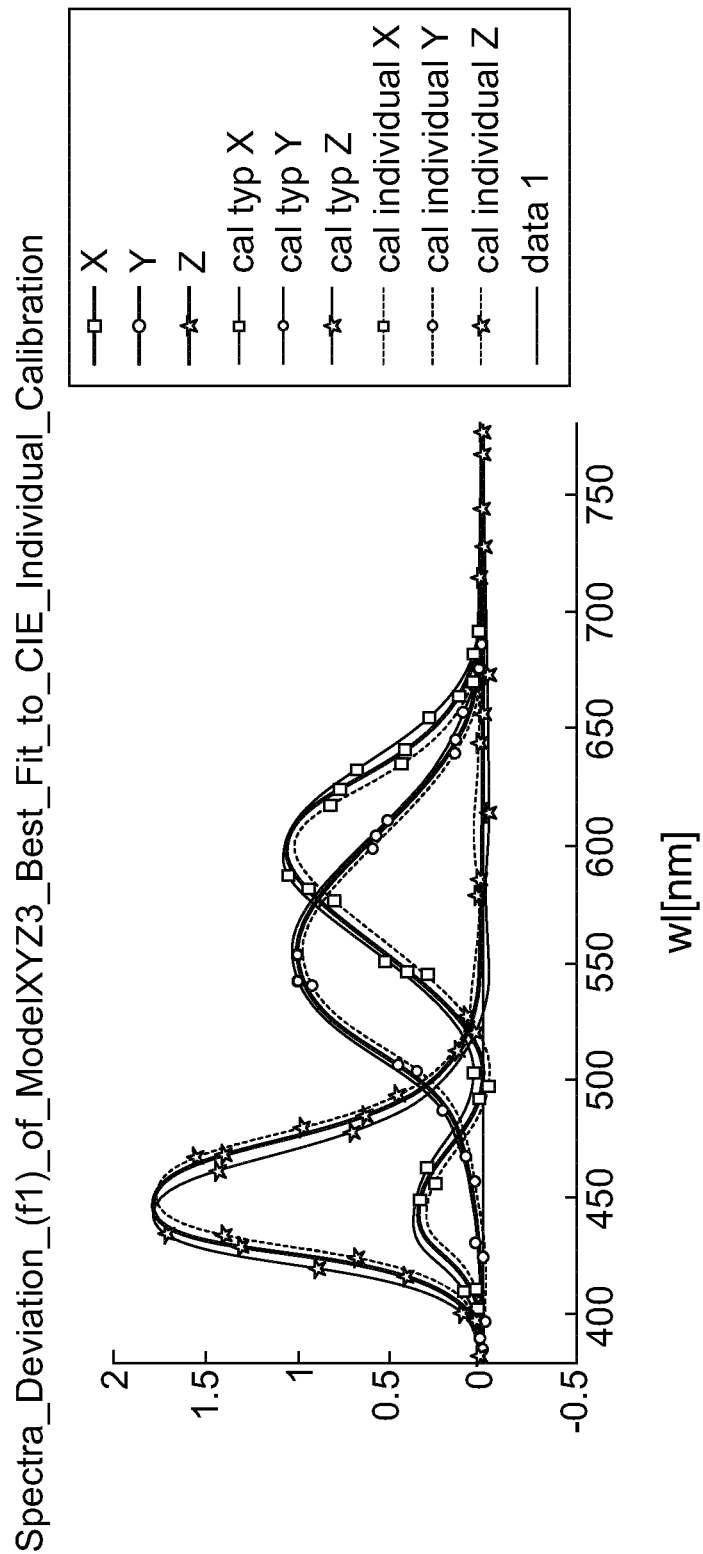
Figure 5:
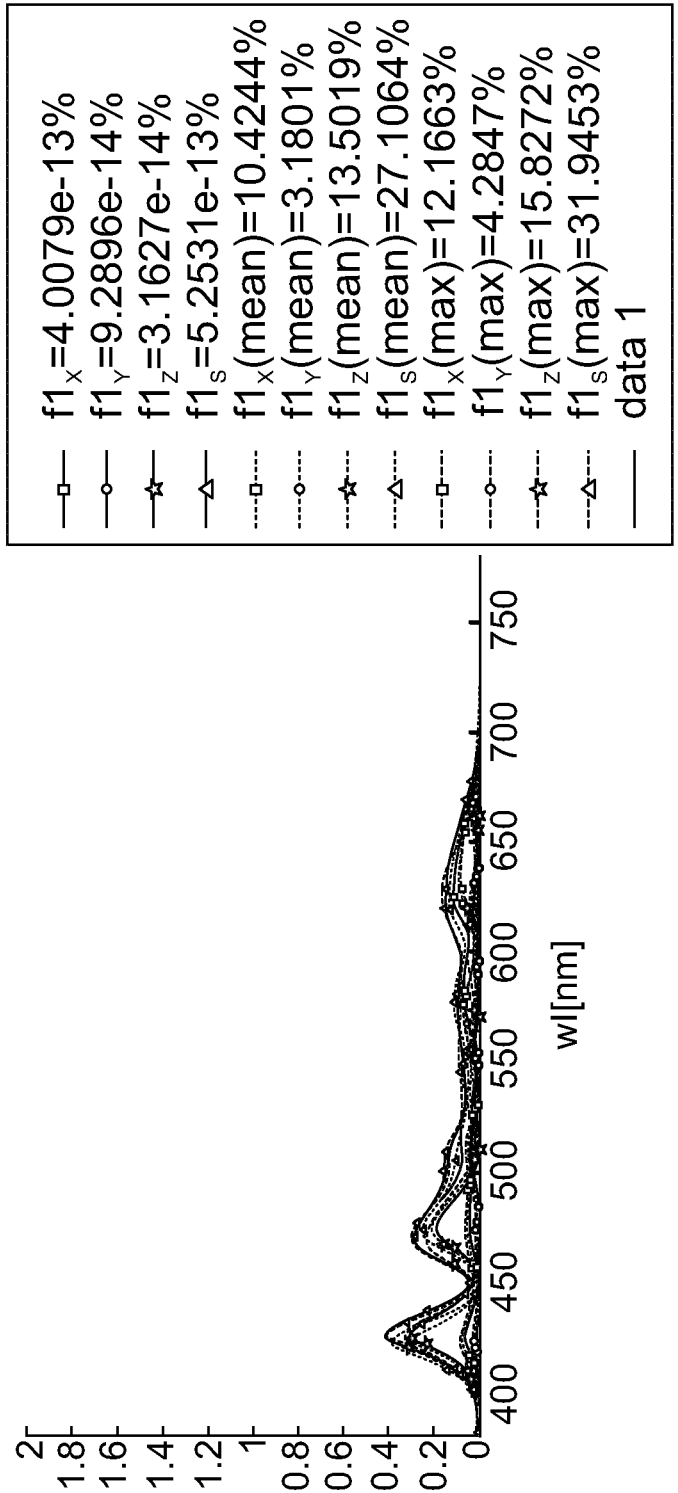

FIG. 2 depicts the CIE XYZ standard observer color matching functions with no calibration applied. FIG. 3 depicts a significant spectral sensitivity variation due to process variations. FIG. 4 depicts an individual best-fit calibration for each of the X, Y and Z functions. FIG. 5 depicts how relatively little compensation is applied. That is, only the middle wavelength range, applicable predominantly to the Y color matching function, is substantially calibrated. The X and Z color matching functions are not substantially calibrated, because no additional spectral information is available in their wavelength ranges to perform such calibration.

As described above, this disclosure describes the design, implementation and use of an integrated radiation sensor for optimized accuracy of color coordinates by means of a specific design and combination of color matching channels and compensation channels. The disclosed solution realizes an individual calibration to a best fit to the CIE XYZ standard observer color matching functions. Key features and benefits of the disclosure include high accuracy ALS, optimized compensation of filter shift (for process and/or optical tolerances), and an integrated radiation sensor that is also suitable for spectral reconstruction, e.g. for obtaining detailed information pertaining to a particular type of a light source.

Figure 6:
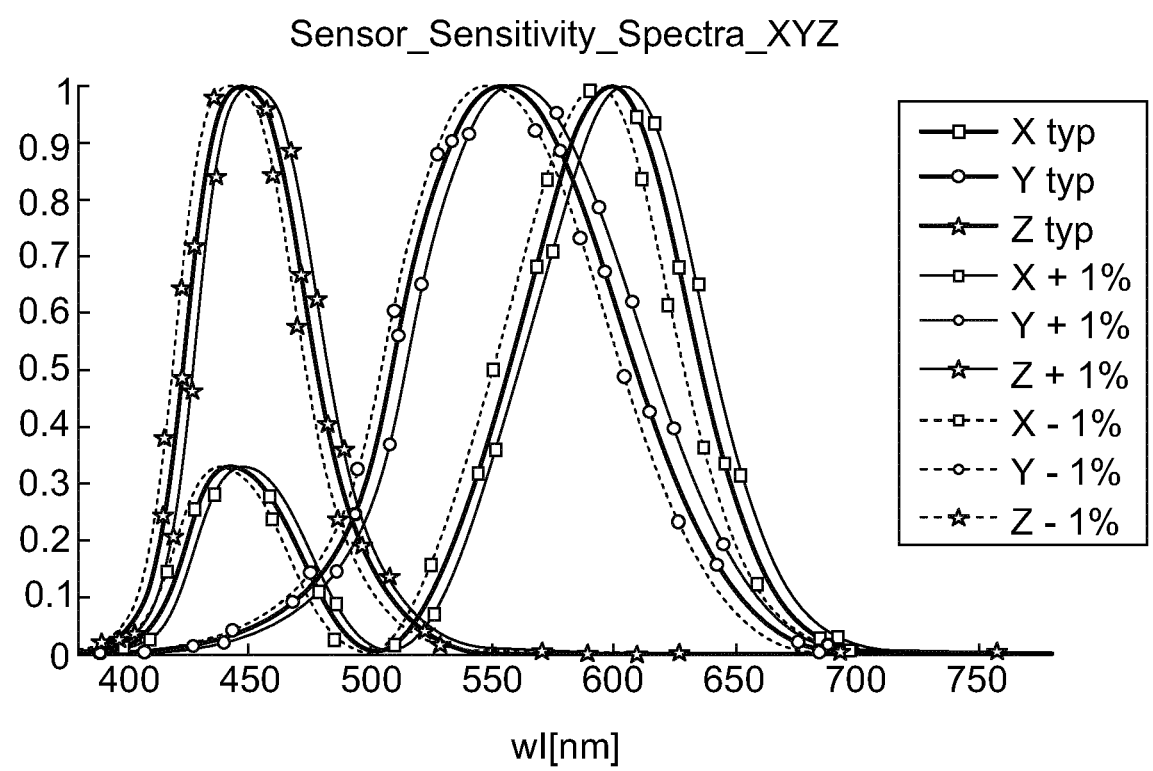
Figure 7:
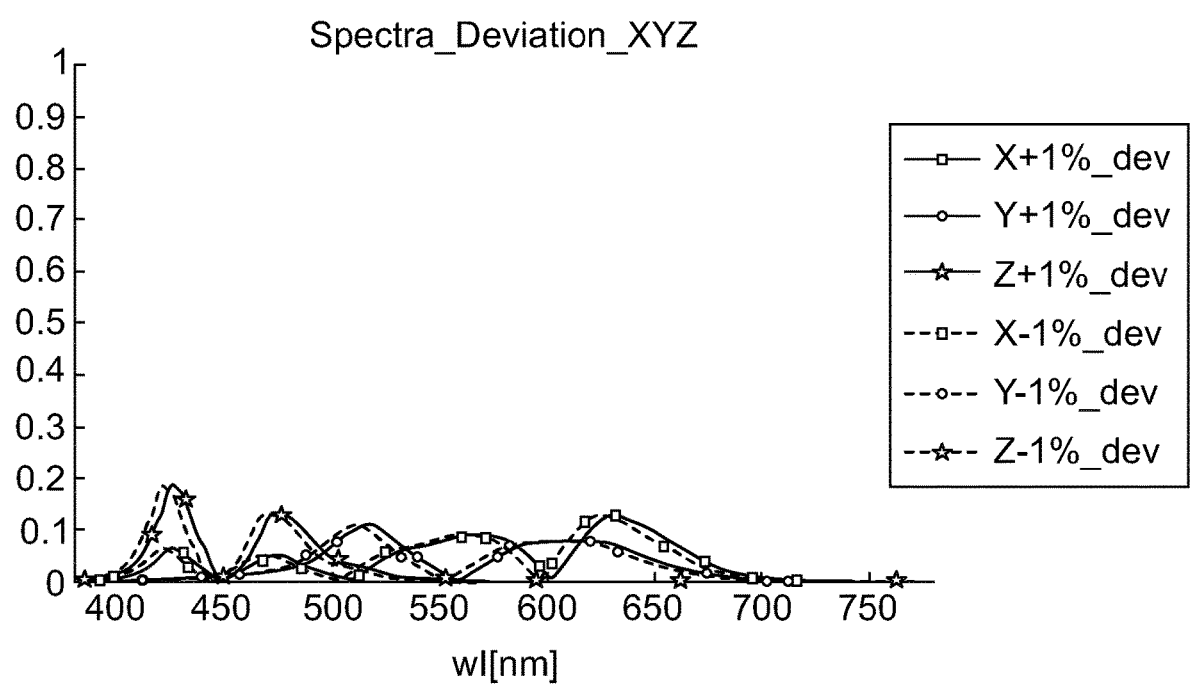

Based on a designed integrated radiation sensor's spectral sensitivity, it is possible to simulate worst-case scenarios of spectral shift. Such a spectral shift may primarily depend upon thickness variations in a filter process, e.g. variations in a thickness of layers forming each interference filter. A shift in a spectral sensitivity of channels of a sensor may vary between different sensors. Furthermore, a spectral shift may not be synchronous across all channels of any individual sensor, e.g. a degree of spectral shift may vary across different channels on a sensor. Further effects may occur due to differing angular distributions of light on the sensor, at least in part because a performance of interference filters may be angularly dependent. That is, a change in an angle of incidence of radiation incident upon the sensor may shift and/or deform a shape, e.g. a profile, of the spectral sensitivity of one or more channels of the sensor to a longer or shorter wavelength. For example, an increase in an angle of incidence of radiation incident upon the sensor may shift and/or deform a shape of the spectral sensitivity of one or more channels of the sensor to a shorter wavelength. The expected worst-case deviation in spectra sensitivity may be simulated. FIG. 6 depicts typical and worst-case shifts for XYZ sensitivity profiles. FIG. 7 depicts the spectra deviation (absolute values of variation) for +1% and −1% variation.

Figure 8:
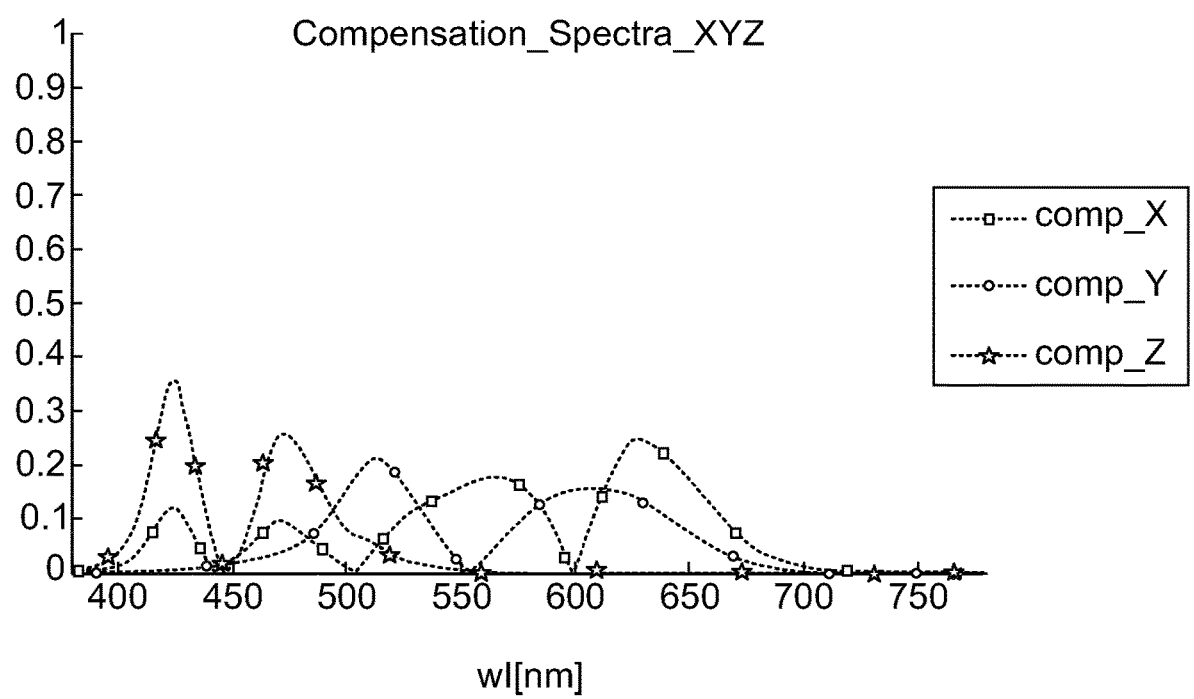
Figure 9:
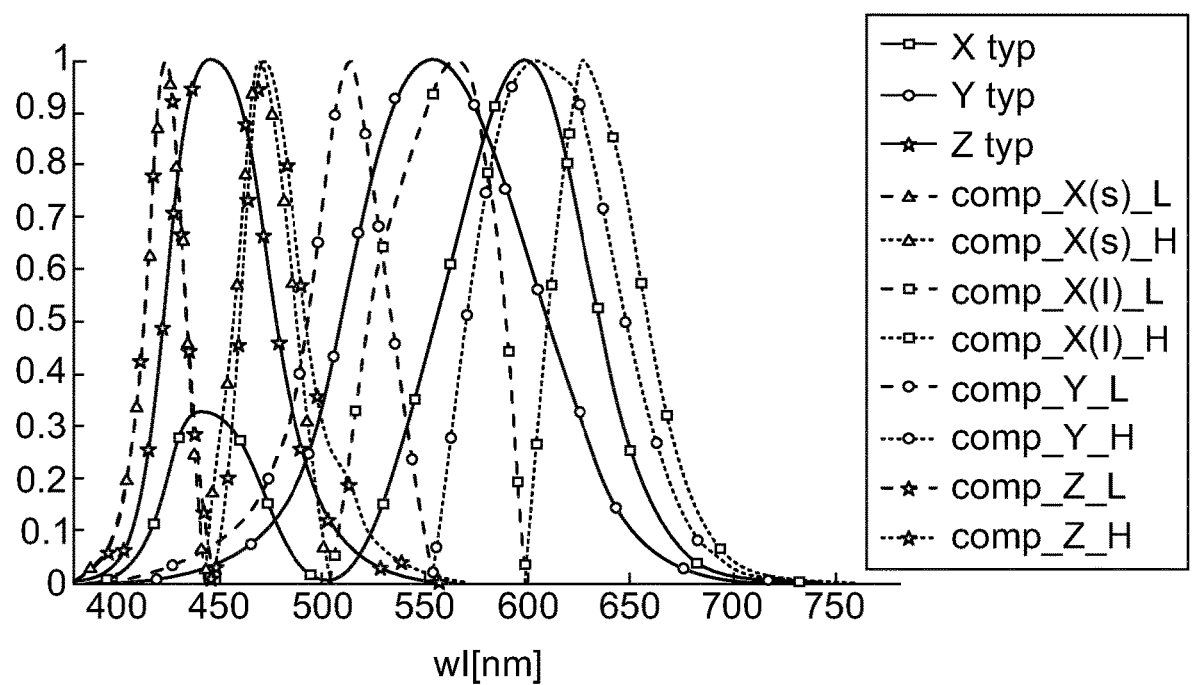

Such deviation information may be used to design optimized compensation channels. As depicted in FIG. 7, based on a synchronous shift, e.g. +/−1%, both of the resultant deviation functions associated with each of the X, Y and Z sensitivity profile are similar in spectral shape. The deviation channel spectra can be added, or combined by averaging. FIG. 8 depicts a summation of the deviation functions. That is, "comp_X" of FIG. 8 corresponds to a summation of "X +1%_dev" and "X −1%_dev" of FIG. 7. Similarly, "comp_Y" of FIG. 8 corresponds to a summation of "Y +1%_dev" and "Y −1%_dev" of FIG. 7, and "comp Z" of FIG. 8 corresponds to a summation of "Z +1%_dev" and "Z −1%_dev" of FIG. 7. In the example described with reference to FIGS. 7 and 8, the combined deviations "comp_X", "comp_Y", and "comp_Z" each comprise a plurality of peaks. For example "comp_X" comprises a first peak at approximately 425 nm, a second peak at approximately 475 nm, a third peak at approximately 560 nm and a fourth peak at approximately 630 nm. The individual peaks are then split into individual channels, wherein one channel may be used to compensate a low-wavelength flank and a second channel may be used to compensate a high-wavelength flank of the typical (color matching) function, as depicted in FIG. 9. In FIG. 9, each of the individual channels derived from the combined deviations "comp_X", "comp_Y", and "comp_Z" have been normalized.

Figure 10:
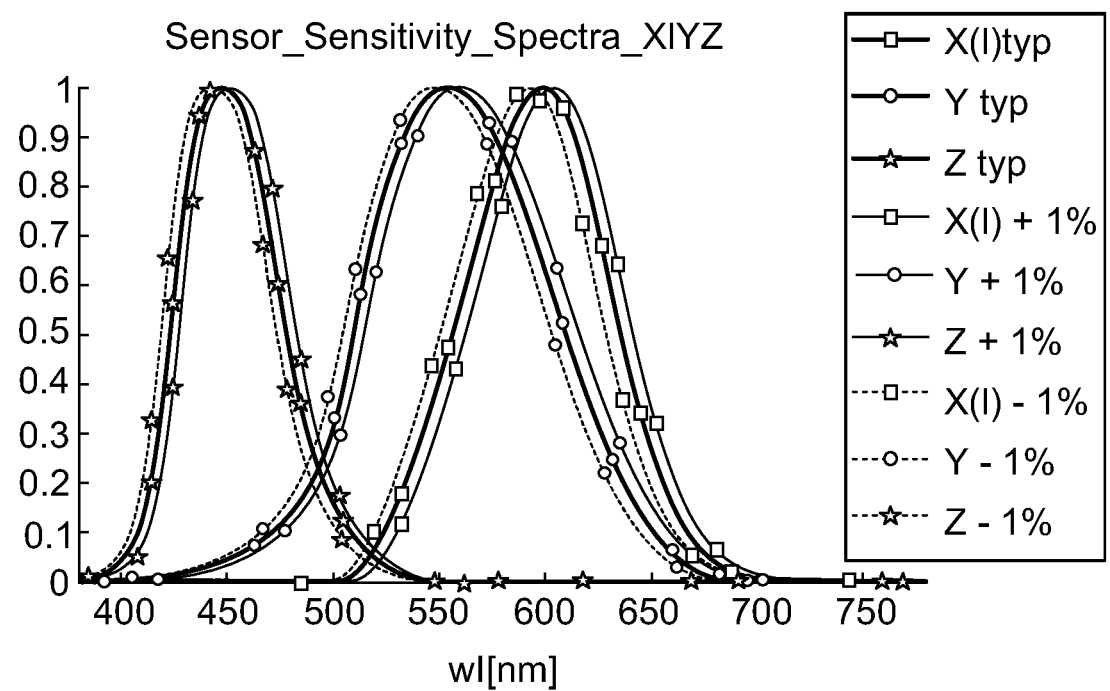
Figure 11:
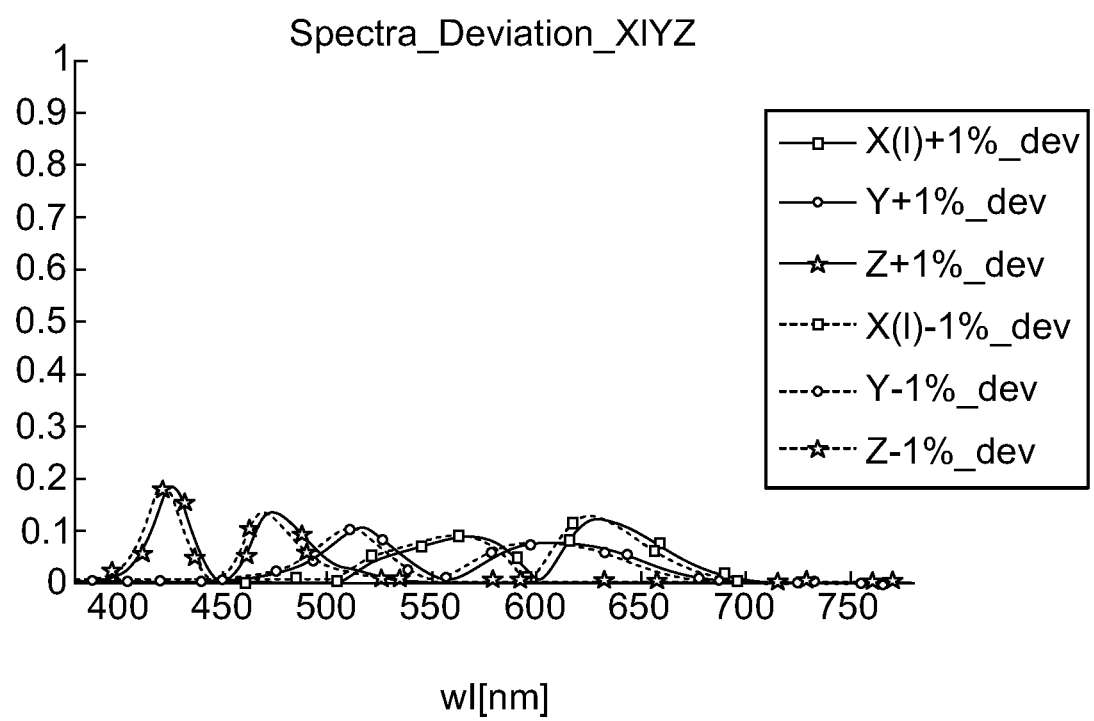
Figure 12:
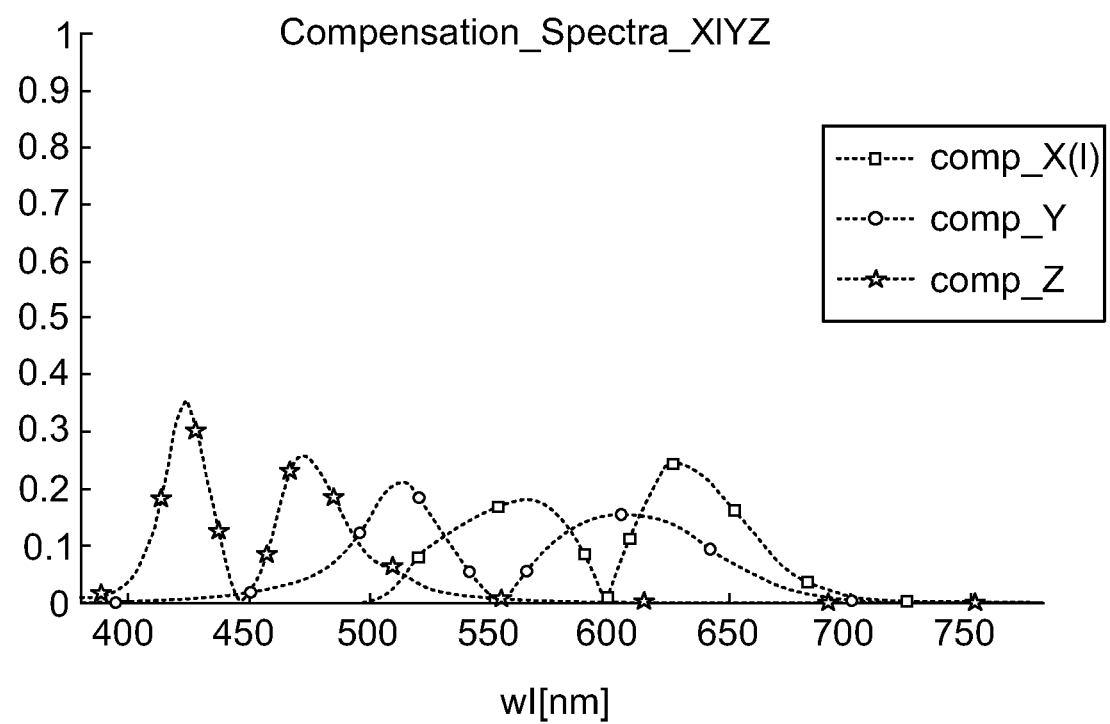
Figure 13:
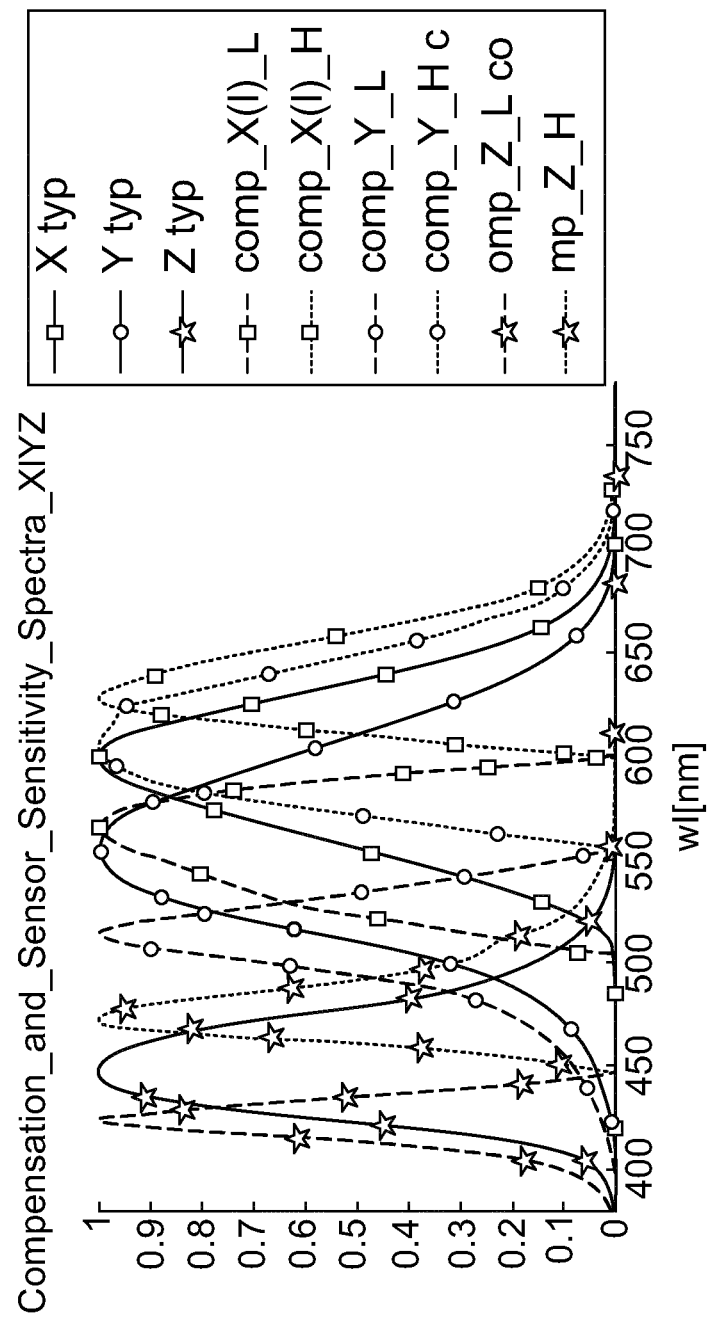

FIG. 10 generally corresponds to FIG. 6, in that it depicts typical and worst-case shift for XYZ sensitivity profiles. However, in FIG. 10, only a longer wavelength portion of the "X" tristimulus value of the CIE standard observer color matching function is present ("X(I)"). Corresponding FIG. 11 depicts a spectra deviation (absolute values of variation) for +1% and −1% variation of the XIYZ sensitivity profiles of FIG. 10. As described above, this deviation information may be used to design optimized compensation channels. FIG. 12 depicts a summation of the resultant deviation functions. That is, "comp_X(I)" of FIG. 12 corresponds to a summation of "X(I) +1%_dev" and "X(I) −1%_dev" of FIG. 11. Similarly, "comp_Y" of FIG. 12 corresponds to a summation of "Y +1%_dev" and "Y −1%_dev" of FIG. 11, and "comp Z" of FIG. 12 corresponds to a summation of "Z +1%_dev" and "Z −1%_dev" of FIG. 11. In the example described with reference to FIGS. 11 and 12, the combined deviations "comp_X(I)", "comp_Y", and "comp_Z" each comprise a plurality of peaks. For example "comp_X(I)" comprises a first peak at approximately 560 nm and a second peak at approximately 630 nm. The individual peaks are then split into individual channels, as described above with reference to FIG. 9. In FIG. 13, each of the individual channels derived from the combined deviations "comp_X (I)", "comp_Y", and "comp_Z" have been normalized.

The functions defined by "comp_X(I)", "comp_Y", and "comp_Z" may be used to form components of a transformation matrix. As such, in accordance with embodiments of the present disclosure, the individual channels derived from the combined deviations "comp_X(I)", "comp_Y", and "comp_Z" may be used to form compensation channels.

Furthermore, in some embodiments, by comparing characteristics of such compensation channels, such as centroids and FWHM relative to other compensation channels, only the most significant compensation channels may be selected, e.g. a subset of the compensation channels as identified in FIGS. 9 and 13 may be selected for implementation.

An example of selecting a subset of the compensation channels, based on the example of FIG. 9, is as follows.

From FIG. 9, it can be seen that the spectra denoted "comp_Z_L" is very similar to the spectra denoted "comp_X(s)_L", in so far as each spectra has a comparable peak position and FWHM.

Similarly, it can also be seen that the spectra denoted "comp_Z_H" is very similar to the spectra denoted "comp_X(s)_H", in so far as each spectra has a comparable peak position and FWHM.

Similarly, it can also be seen that the spectra denoted "comp_Y_H" is very similar to the spectra denoted "X typ".

Similarly, it can also be seen that the spectra denoted "comp_X(I)_L" is very similar to the spectra denoted "Y typ".

In accordance with this analysis, an example embodiment of an integrated radiation sensor comprising a combination of channels for compensating for a best-fit to the XYZ color matching function and also comprising channels which may also be more generally suitable for spectral reconstruction, may comprise the channels with spectral sensitivities corresponding to: "comp_Z_L", "Z typ", "comp_Z_H", "comp_Y_L", "Y typ", "X typ" and "comp_X(I)_H". The spectral sensitivities for channels of an integrated radiation sensor according to the described embodiment is depicted in FIG. 14.

In further embodiments, additional channels may be implemented to provide an integrated radiation sensor capable of sensing radiation over most or all of the VIS range and/or at least a portion of the ultraviolet (UV) and/or near infrared (NIR) ranges. For example, FIG. 15 depicts spectral sensitivities of channels of an embodiment of an integrated radiation sensor comprising additional channels relative to the embodiment depicted in FIG. 14. That is, the embodiment depicted in FIG. 15 comprises one additional channel, denoted "channel 1", in a relatively short wavelength range, e.g. with a peak at corresponding to a wavelength of approximately 410 nm. The embodiment depicted in FIG. 15 also comprises two additional channels, denoted "Channel_9" and "Channel_10" in a relatively long wavelength range, e.g. with peaks corresponding to wavelengths of approximately 680 nm and 725 nm respectively.

Figure 14:
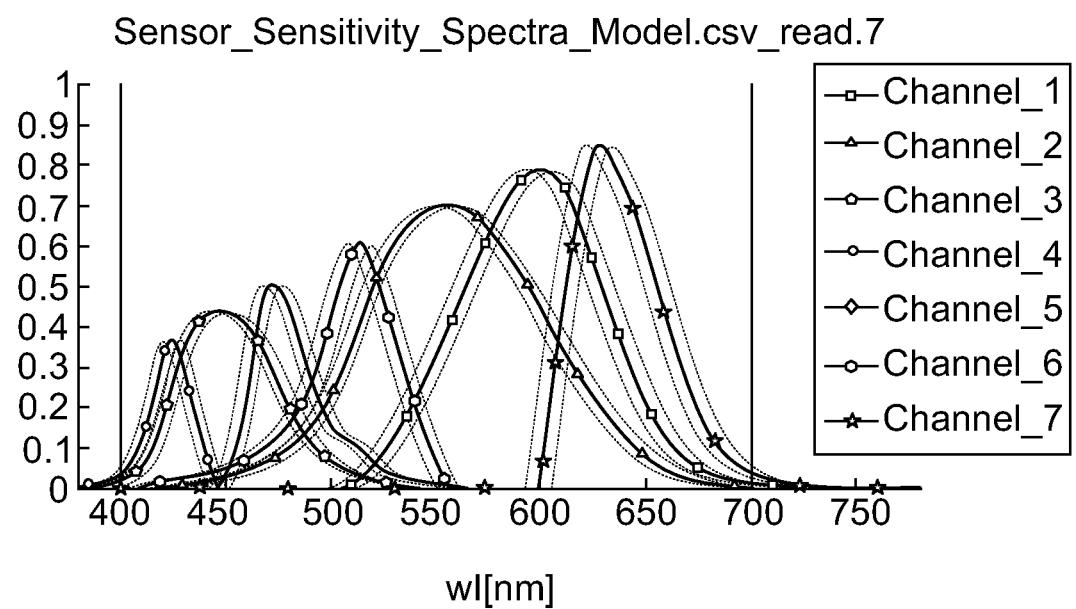
Figure 15:
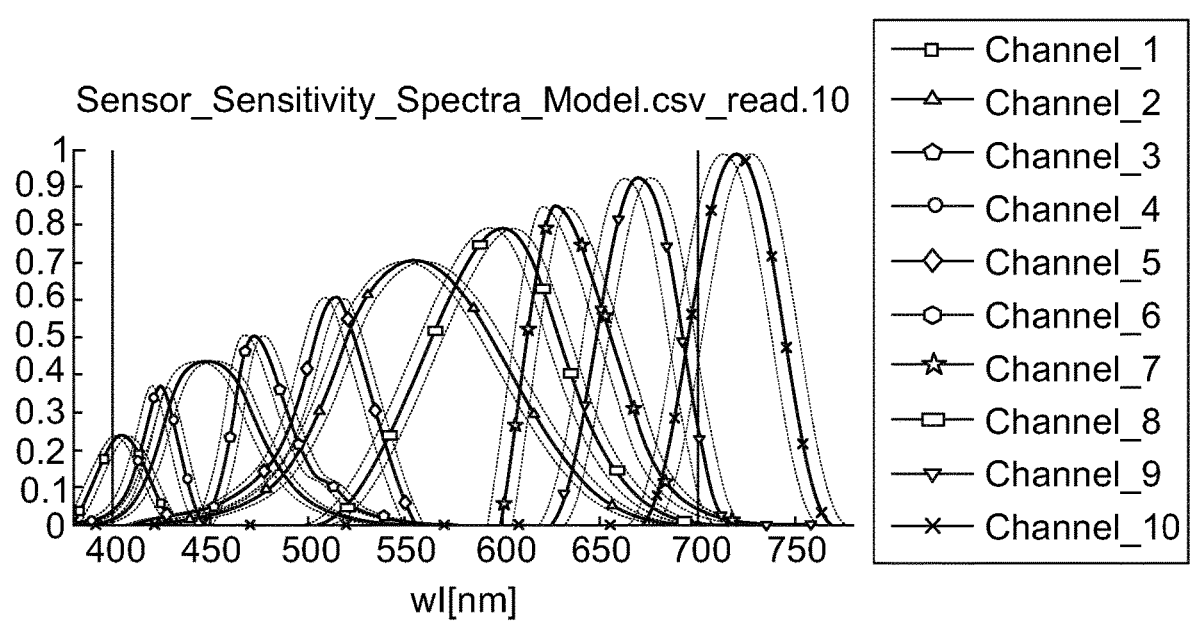
Figure 16:
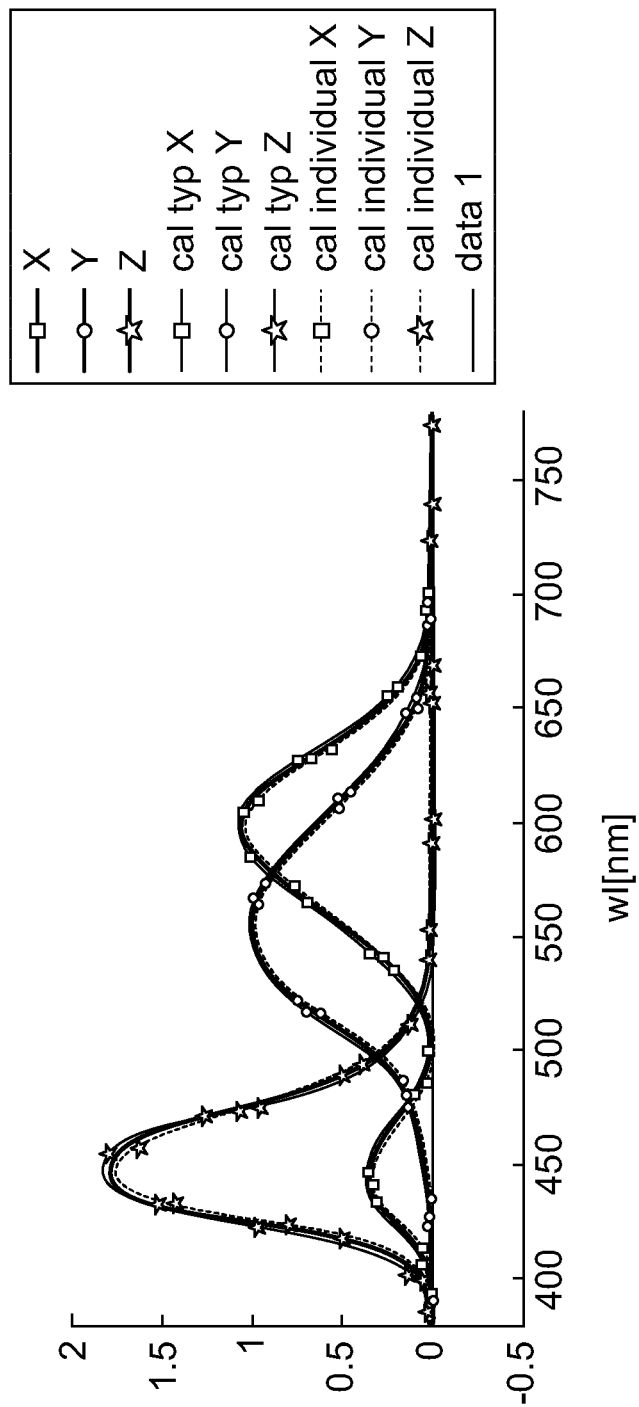
Figure 17:
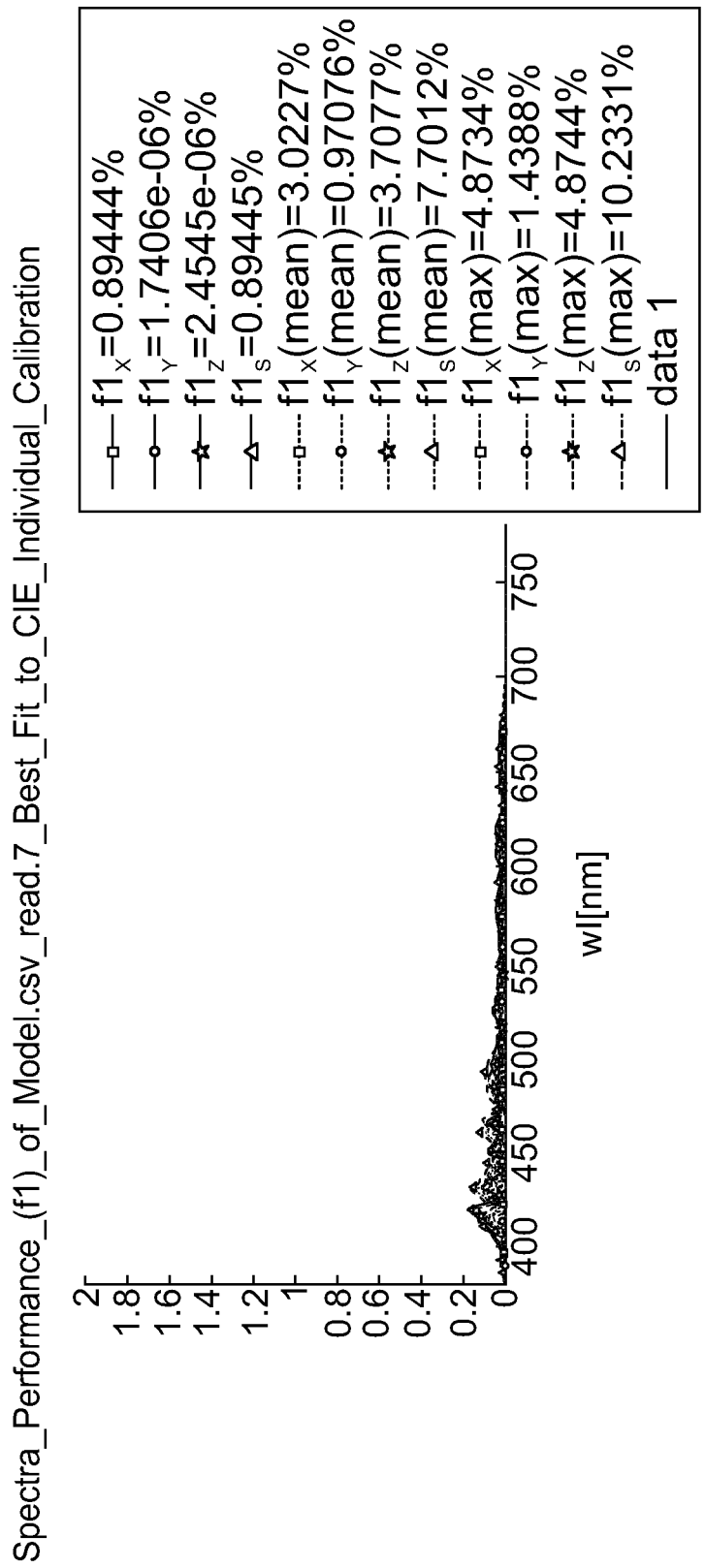

FIGS. 16 and 17 depict an achievable performance of best spectral fit of the 7 channels of the embodiment of FIG. 14 (all 127 worst case shift combinations) to the CIE XYZ standard observer color matching functions. There are no differences having additional channels as seen in FIG. 15 because they are not primary part of XYZ. A procedure for applying compensation based of the knowledge of the spectral sensitivity (spectral shift) of each integrated radiation sensor, and each channel of said sensor, is as follows.

A database may be generated based on a spectral sensitivity of the integrated radiation sensor. Such a database may be generated by, for example, performing a monochromatic sweep test, and/or by reconstruction of spectral sensitivity based on multiple light sources, and/or by an alternative spectra reconstruction using less narrow band spectra and constants in spectral sensitivity characteristics.

A matrix of the channel sensitivity data may be generated. In the example of the 7-channel integrated radiation sensor of FIG. 14, wherein spectral sensitivity data for each channel is formed from 400 steps ranging from 380 nm to 780 nm in 1 nm steps, a matrix S [7×400] may be generated.

A matrix, denoted $CIE_{XYZ}$ [3×400] may correspond to a desired color matching function in the same spectral range, e.g. the XYZ color matching function.

A matrix M [7×3] corresponding to an individual calibration matrix for each integrated radiation sensor may then be calculated as follows:

$$M = (CIE_{XYZ} * S^T) * (S * S^T)^{-1} \qquad \text{Equation (1)}$$

In use, to perform a color calculation in an application, a vector of data [1×7] is read from the integrated radiation sensor, and the color is calculated as:

$$XYZ = M * data \qquad \text{Equation (2)}$$

Fields of application of the disclosed integrated radiation sensor include: general ALS in mobile devices, automotive and accessories; Light source identification/detection (typical and mixed light sources); ALS for camera AWB; ALS for color management in a display; and ALS for color management in multi-color light sources In some embodiments, the determined compensation channels may be configured to have a spectral sensitivity generally conforming to a substantially Gaussian or Cosine shape. In some embodiments, peak position and/or FWHM of the spectral sensitivity of compensation channels may be selected to more closely adhere to a substantially Gaussian or Cosine shape. In some embodiments, individual flanks of the sensitivity spectra of one or more of the compensation channels may be smoothed to more closely conform to a substantially Gaussian or Cosine shape.

Figure 18:
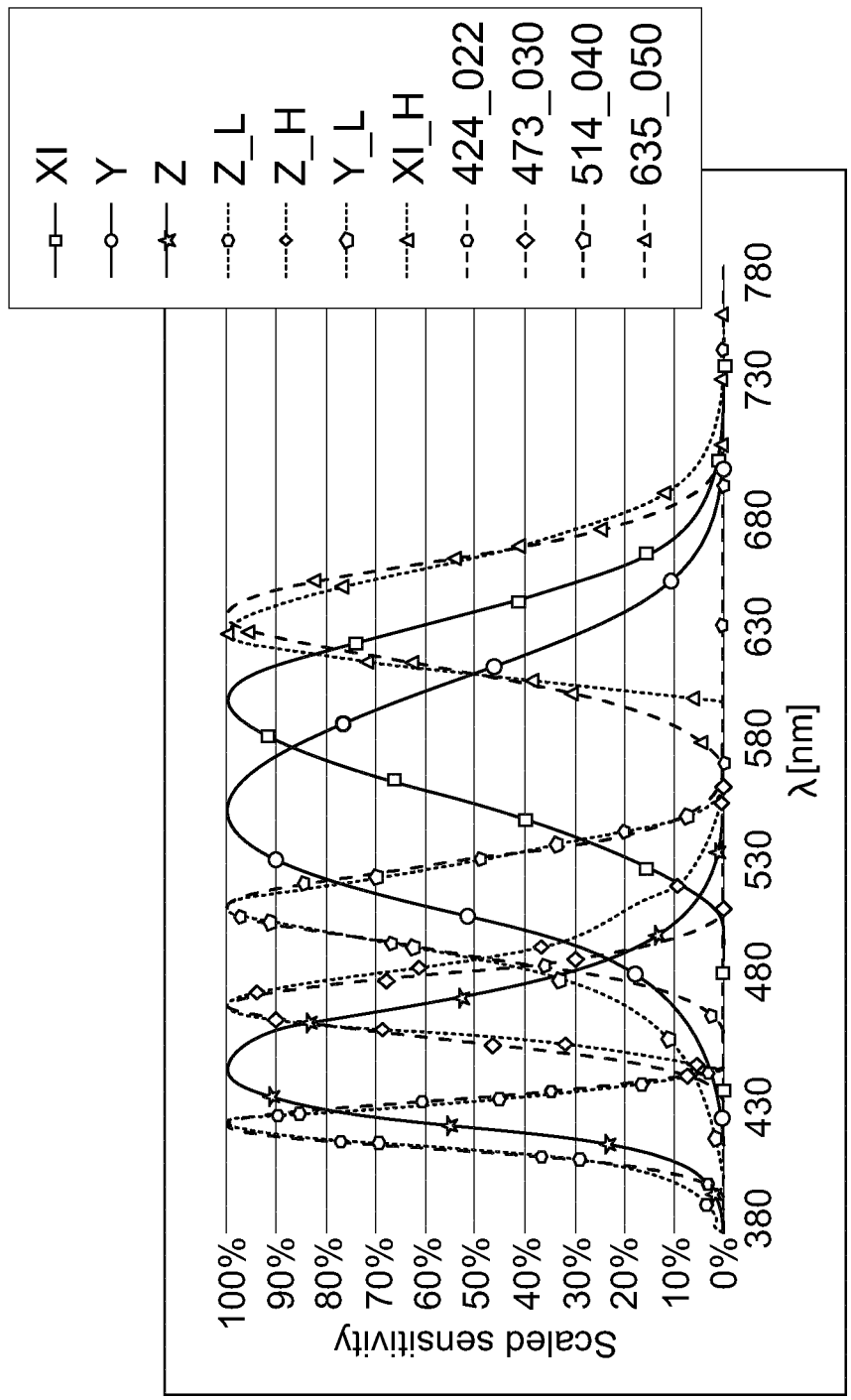

FIG. 18 depicts an example embodiment comprising channels exhibiting substantially Gaussian-shaped spectral sensitivities, with a generally close fit to the calculated compensation shape, e.g. within an acceptable margin of error. Beneficially, designing channels, e.g. the filters associated with each channel, to exhibit a spectral sensitivity generally conforming to a substantially Gaussian or Cosine shape may simplify processes of filter design and/or production.

Figure 19A:
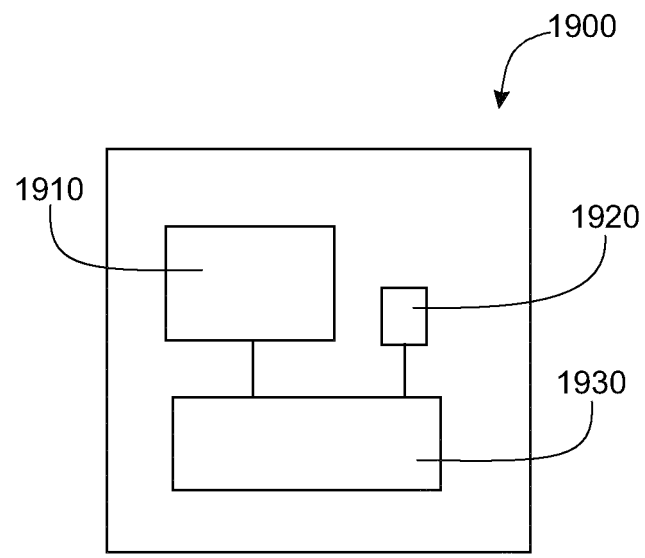

FIG. 19a depicts an electronic device 1900 according to an embodiment of the disclosure. The electronic device 1900 comprises a display 1910 that displays images for a user. The electronic device comprises an integrated radiation sensor 1920. The integrated radiation sensor is an integrated radiation sensor 1920 as described above, comprising a plurality of color matching channels and a plurality of compensation channels.

The electronic device 1900 comprises control circuitry 1930 coupled to the display 1910 and the integrated radiation sensor 1920. The control circuitry 1930 may be configured to determine a color of light incident upon the radiation sensor 1920 based upon at least one signal from the integrated radiation sensor 1920. The control circuitry 1930 may be configured to adjust the display 1910 based at least in part on a determined color. For example, the control circuitry 1930 may adjust a color and/or brightness and/or contrast of the display in response to a determined color of an ambient light.

Figure 19B:
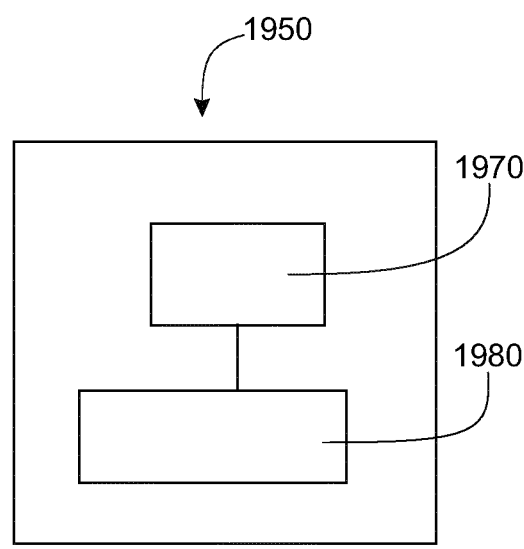

FIG. 19b depicts a camera 1950 according to an embodiment of the disclosure. The camera 1950 comprises an integrated radiation sensor 1970. The integrated radiation is an integrated radiation sensor 1970 as described above, comprising a plurality of color matching channels and a plurality of compensation channels. The camera comprises control circuitry 1980 configured to determine a color of light incident upon the radiation sensor 1970 based upon at least one signal from the integrated radiation sensor 1970. In an example embodiment, spectra and color information may be used for AWB of an image to a standard or optimized ambient light, for example D65, or the like. Such an image may be stored as a calibrated image. The calibrated image may be independent of the display image white balancing, thus enabling a contrast to ambient light at a location where the image is displayed. In some embodiments, the image may be adjusted, such as white balanced, based on a sensed ambient light at a location at which image is captured, e.g. the photograph is taken. In some embodiments the image may additionally or alternatively be adjusted, e.g. white balanced, based on a sensed ambient light at a location at which the image is displayed, which may be remote from the location of image capture.

Figure 20:
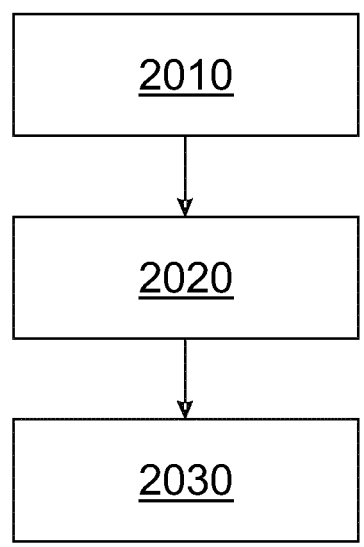

FIG. 20 depicts a method of calibrating an integrated radiation sensor according to an embodiment of the disclosure. The method comprises a step 2010 of exposing the sensor to incident radiation from a known source of radiation. For example, the step 2010 may comprise performing a monochromatic sweep test, and/or exposing the sensor to multiple light sources.

The method comprises a step 2020 of generating a sensitivity matrix corresponding to the incident radiation sensed by each of the plurality of channels of the sensor. For example, for a seven-channel sensor configured to sense in 400×1 nm steps from 380 nm to 780 nm, a sensitivity matrix of dimension 7×400 may be generated.

A predefined matrix may be defined for a color matching function. For example, the CIE-XYZ color matching function may be defined by a matrix of 3×400 entries.

As such, in a next step 2020, a calibration matrix may be generating and stored, wherein the calibration matrix corresponds to the sensitivity matrix adapted for a color matching function. Subsequent measurements of radiation by the integrated radiation sensor may be scaled by the calibration matrix to provide a calibrated spectral response.

While the above disclosure relates to multi-spectral sensors for ambient light sensing or colorimetric applications, when using such a multi-spectral sensor for light source detection and/or identification applications, a limited spectral resolution may be achievable.

A relatively low channel count spectral sensor, e.g. in the region of 8 channels, may be capable of reconstructing only a generally smoothed spectra of measured light. While this may be sufficient for accurately determining parameters such as color coordinates, CCT or Lux, this may in some instances be insufficient for identifying some light sources, and in particular fluorescent light sources.

That is, multi-spectral sensors may be limited in their reconstruction resolution due to factors such as an amount of spectral channels, and characteristics such as FWHM of the spectral response of each channel. However, in some applications, such as high quality display and camera management, it may be necessary to accurately identify light sources.

Typical white light source types can be classified as:
Thermal sources, such as D50, D65, A, C, or the like;
Fluorescent sources; and
LEDs, such as warm, neutral and cold white LEDs.

Figure 21:
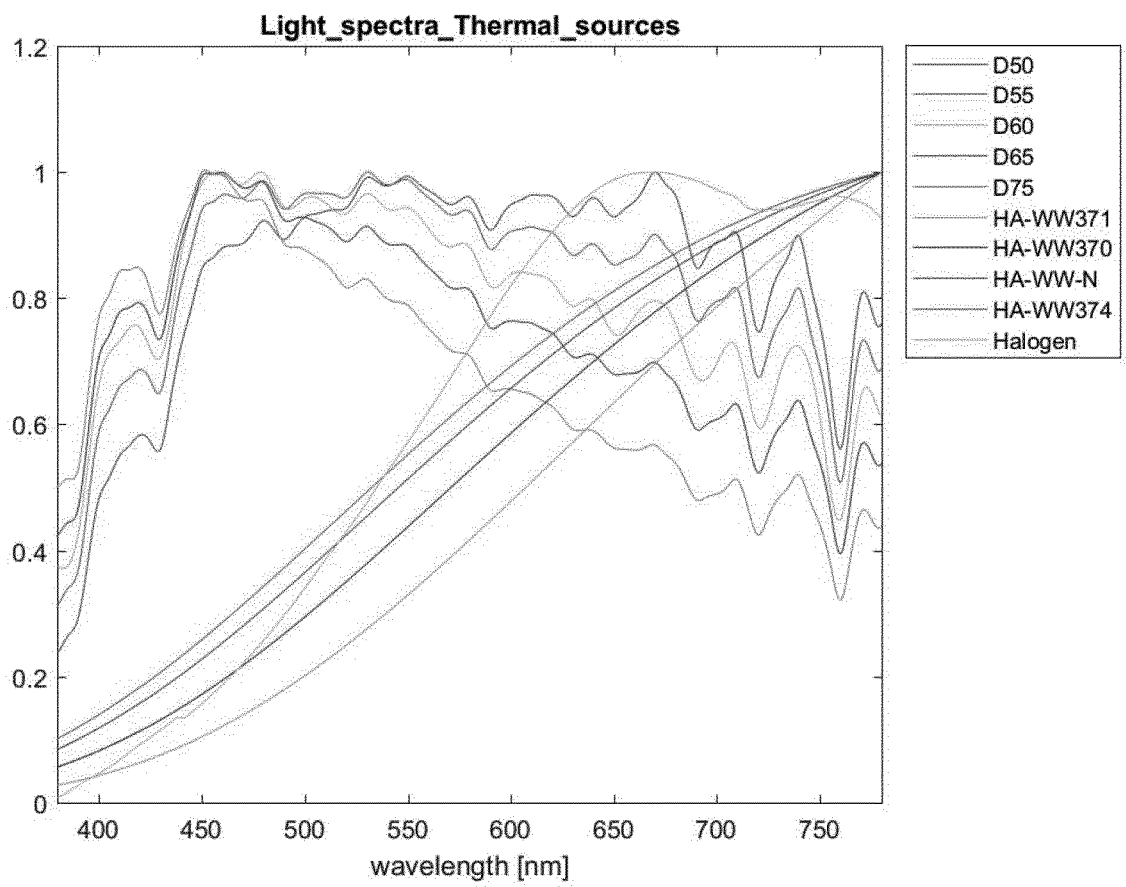
FIG. 21 depicts example spectral responses of a range of different thermal light sources.
Figure 22:
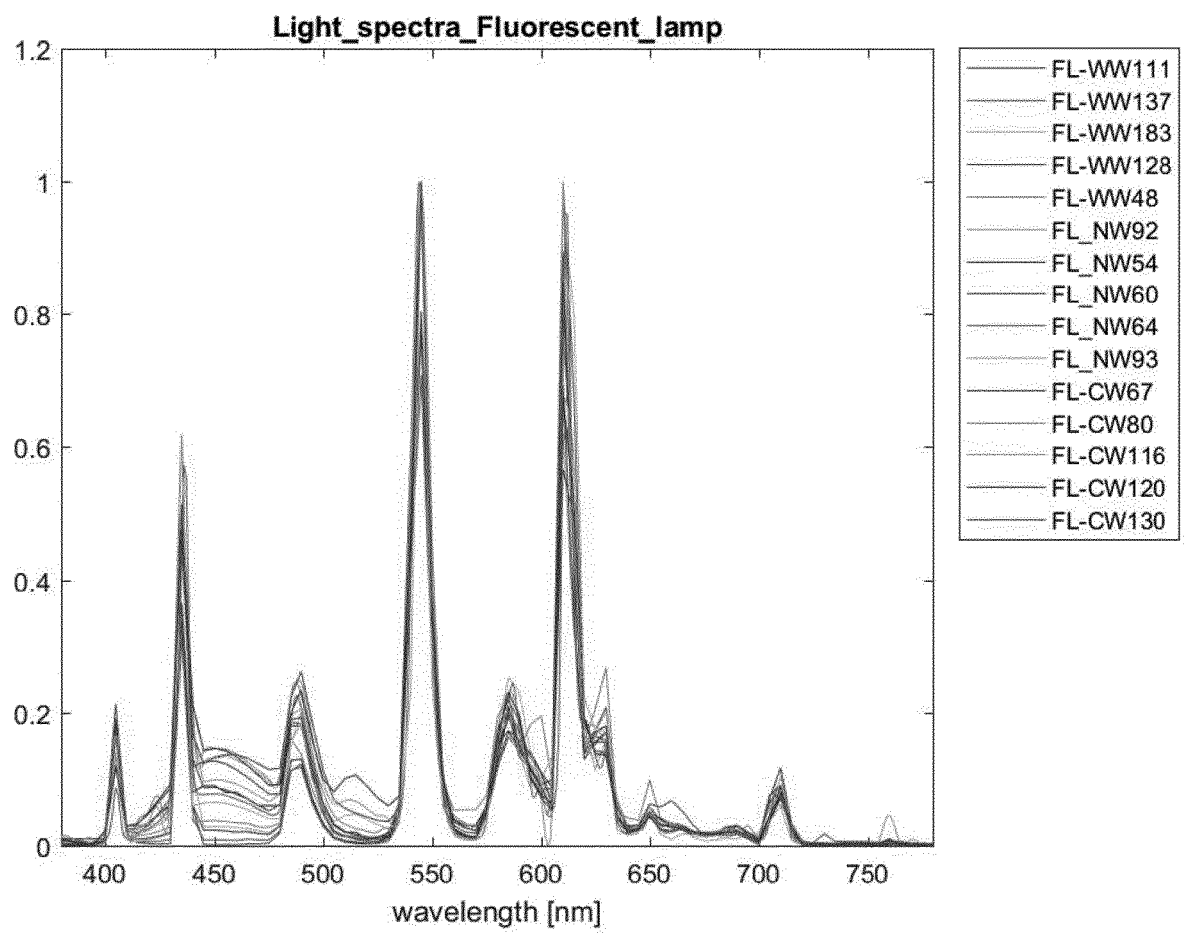
FIG. 22 depicts example spectral responses of a range of different fluorescent light sources.
Figure 23:
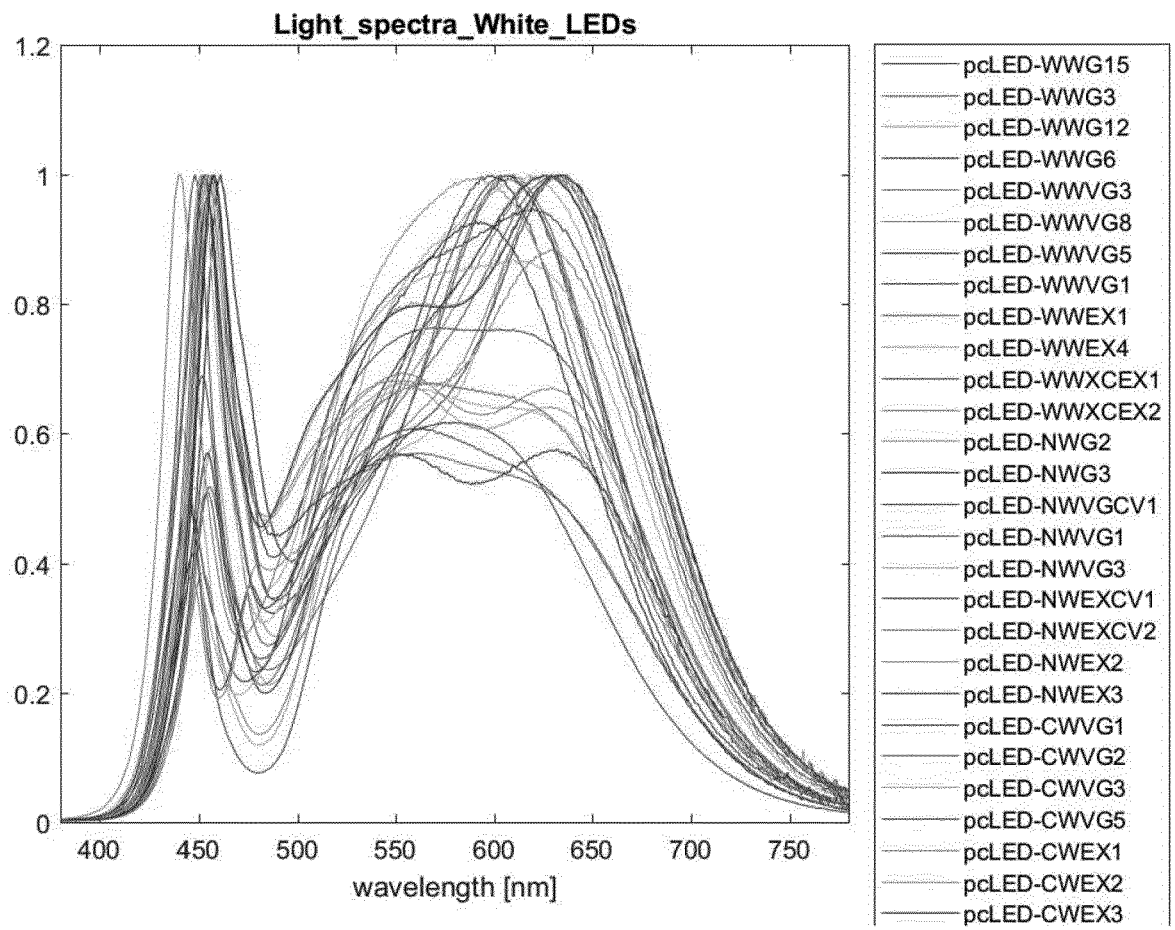
FIG. 23 depicts example spectral responses of a range of different white LEDs.

For example, FIG. 21 depicts example spectral responses of a range of different thermal light sources, FIG. 22 depicts example spectral responses of a range of different fluorescent light sources, and FIG. 23 depicts example spectral responses of a range of different white LEDs.

If can be seen that spectra corresponding to the fluorescent light sources differs from the spectra of the thermal light sources and white LEDs, because the spectra corresponding the to the fluorescent light sources comprises narrow band spikes. These spikes corresponds to emission spectra of mercury and may be known in the art as Hg bands. For example, it can be seen in FIG. 22 that a Hg band is centered at approximately 545 nanometers. Such spikes are not easy to detect or accurately reconstruct using a relatively low channel count spectral sensor.

Figure 24:
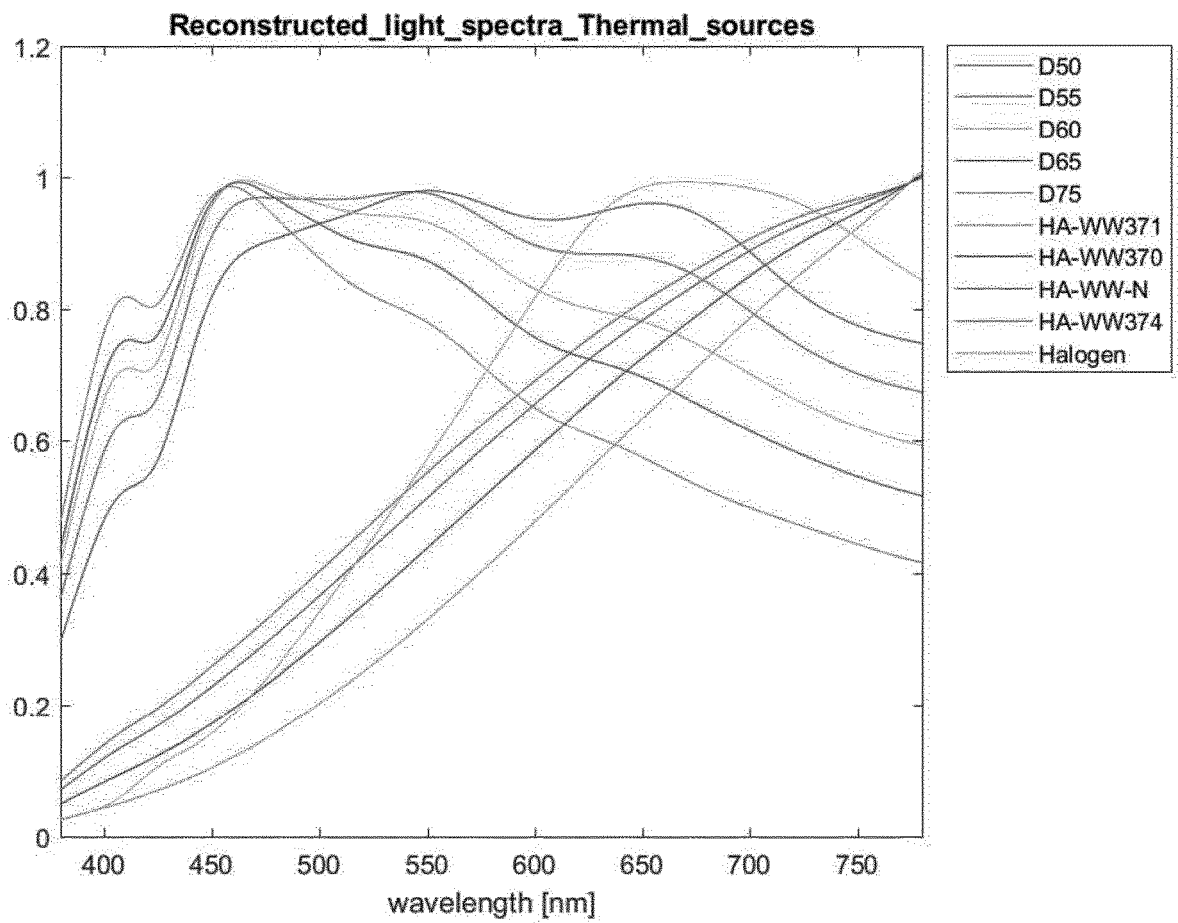
FIG. 24 depicts example reconstructed spectra corresponding to the range of different thermal light sources of FIG. 21.
Figure 25:
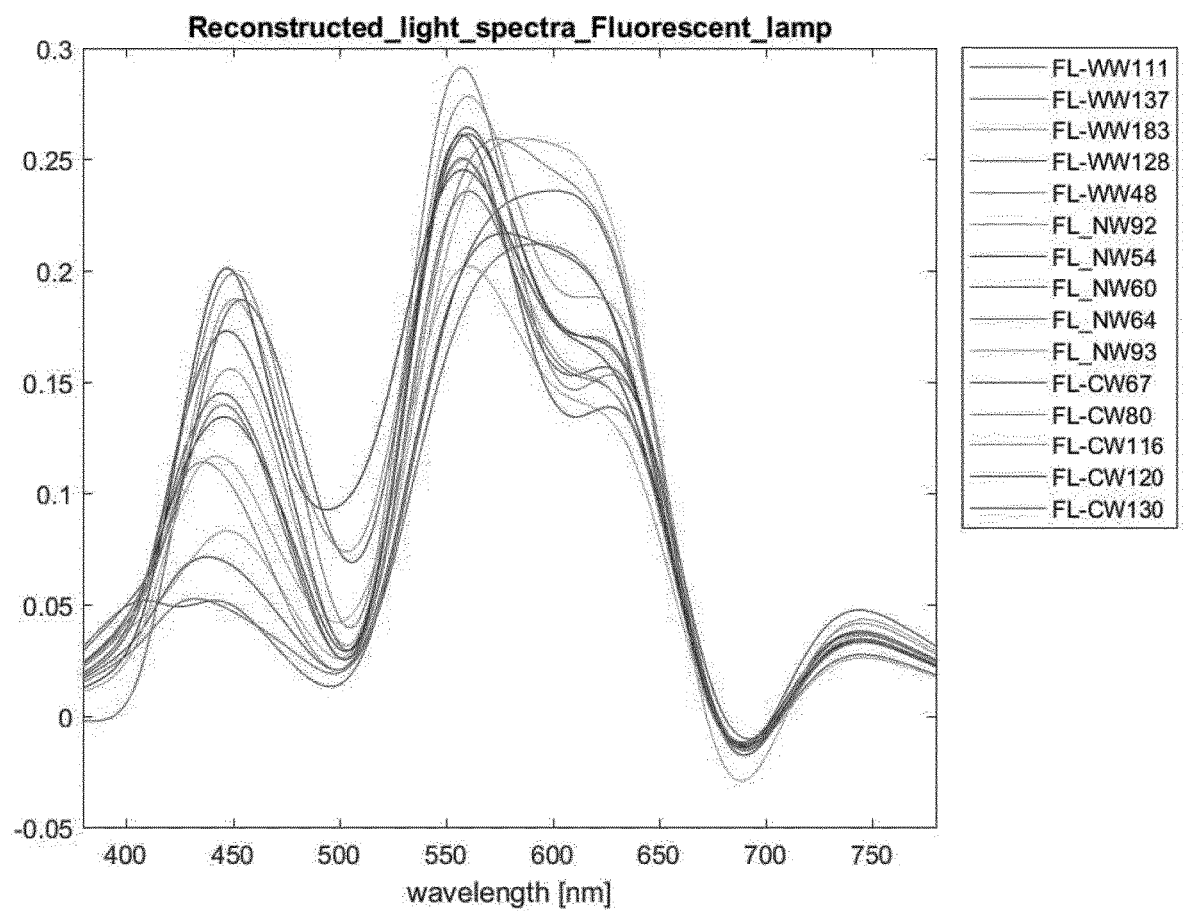
FIG. 25 depicts example reconstructed spectra corresponding to the range of different fluorescent light sources of FIG. 22.
Figure 26:
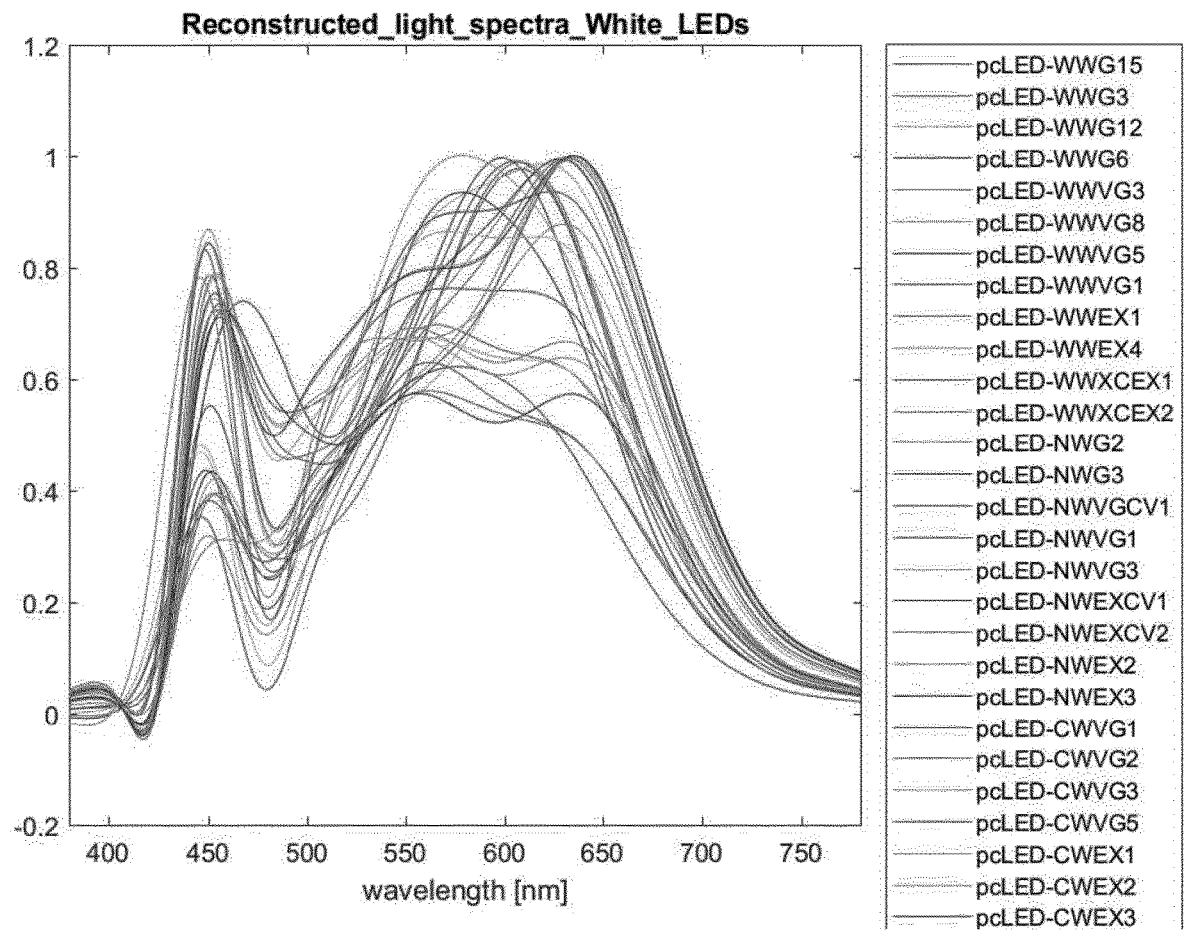
FIG. 26 depicts example reconstructed spectra corresponding to the range of different white LEDs of FIG. 23.

For example, FIGS. 24 to 26 depicts example reconstructed spectra corresponding to the range of different thermal light sources depicted in FIGS. 21 to 23 respectively.

It can be seen that the spectral reconstruction using a multi spectral sensor has provided a smoothed spectra. The smoothed spectra may have a sufficient quality for identifying thermal and LED light sources. However, the characteristic Hg bands associated with Fluorescent light sources are not identifiable in FIG. 25, and therefore identification of any particular FL light sources may be difficult.

Thus, in some embodiments of the disclosure, the integrated radiation sensor comprises a further channel, wherein the further channel comprises a radiation-sensing element and an associated optical filter having a passband centered at approximately 545 nanometers, e.g. centered on a Hg band. The further channel may be used to clearly identify an Hg band, and thus significantly increase a performance of light source detection and identification, as described in more detail below.

Figure 27:
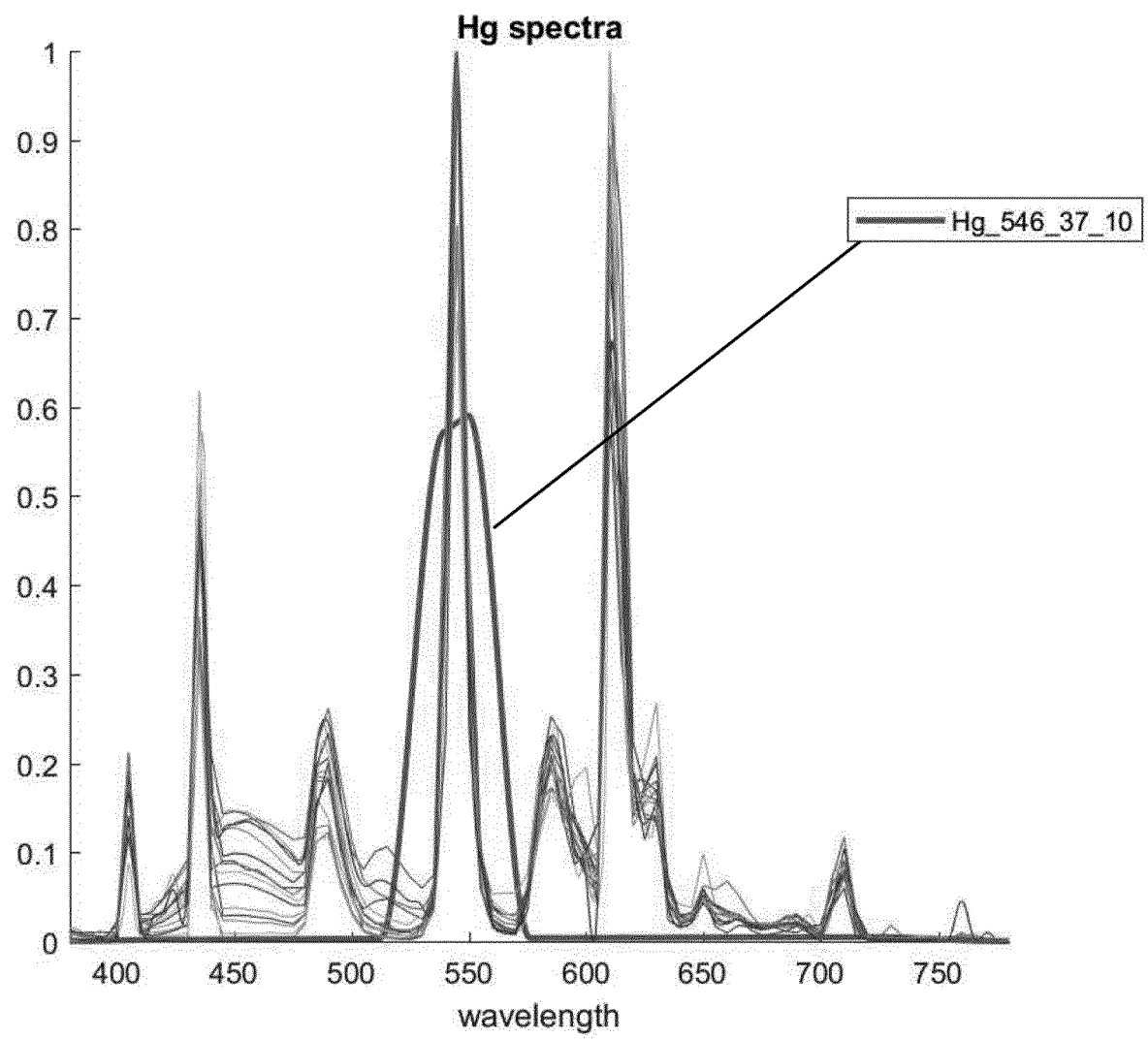
FIG. 27 depicts example spectral responses of a range of different fluorescent light sources, and a passband of an optical filter centered at approximately 545 nanometers.

FIG. 27 provides example spectral responses of a range of different fluorescent light sources, and a passband denoted "Hg_546_37_10" of the associated optical filter centered at approximately 545 nanometers. In the example of FIG. 27 it can be seen that the passband has a width of approximately 10 nanometers. Advantageously, this may ensure that the Hg band centered at approximately 545 nanometers falls within the passband, even when accounting for any process variations in the filter.

Figure 28:
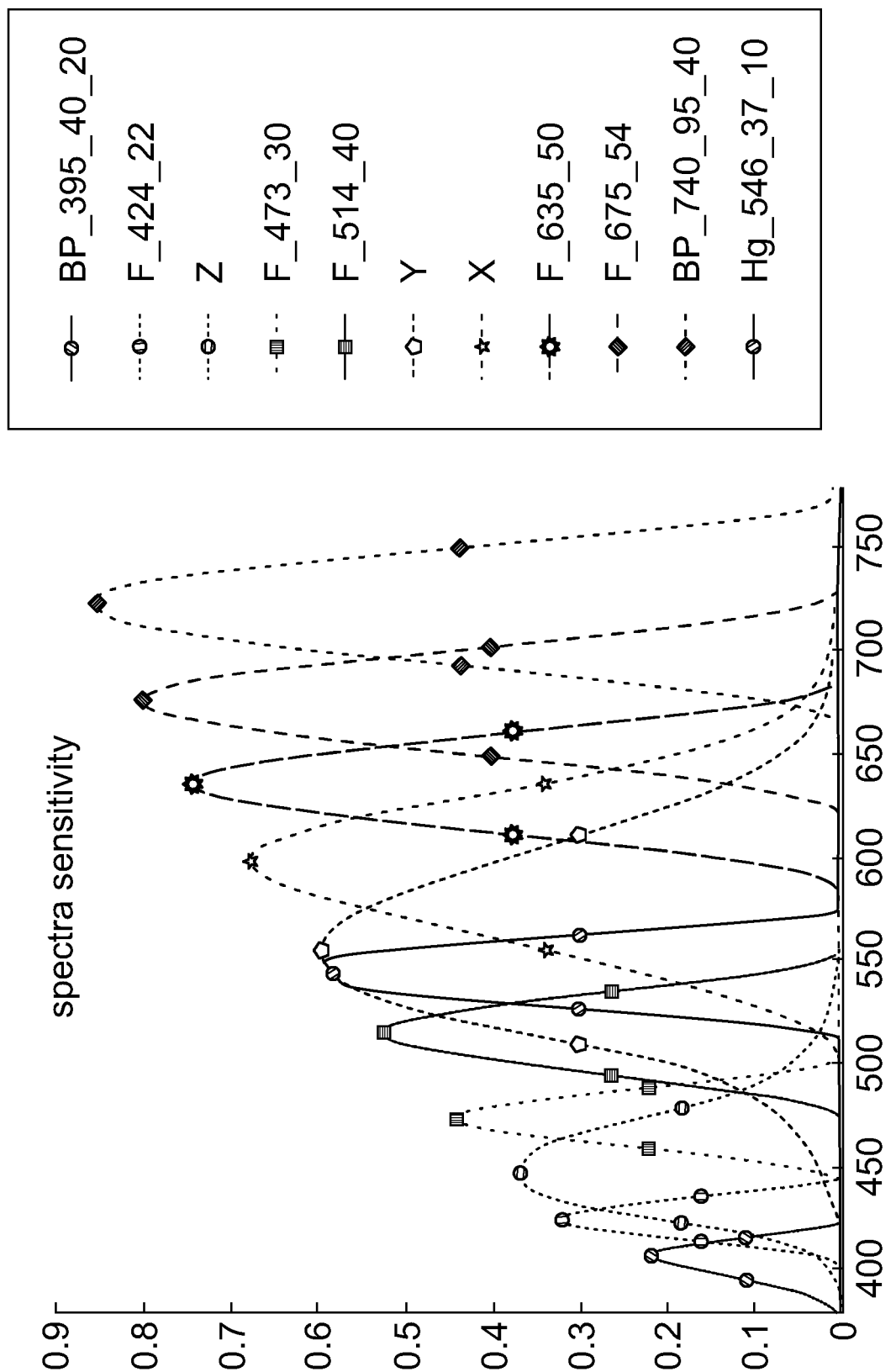
FIG. 28 depicts an example of a sensor sensitivity spectra, including a dedicated Hg channel.

FIG. 28 depicts an example of a sensor sensitivity spectra, including a dedicated further channel, hereafter referred to as a Hg channel. That is, the sensor sensitivity spectra of FIG. 28 corresponds to that of a multi-spectral sensor having 11 channels, including the dedicated Hg channel.

Two methods are described below for accurately detecting and/or identifying a fluorescent light source. It will be understood that embodiments of the disclosed integrated radiation sensors may employ either or both of the two methods described below.

The first method relies on comparing a spectral response of the Hg channel to the reconstructed spectra to distinguish a fluorescent light source from other types of light source spectra.

Figure 29:
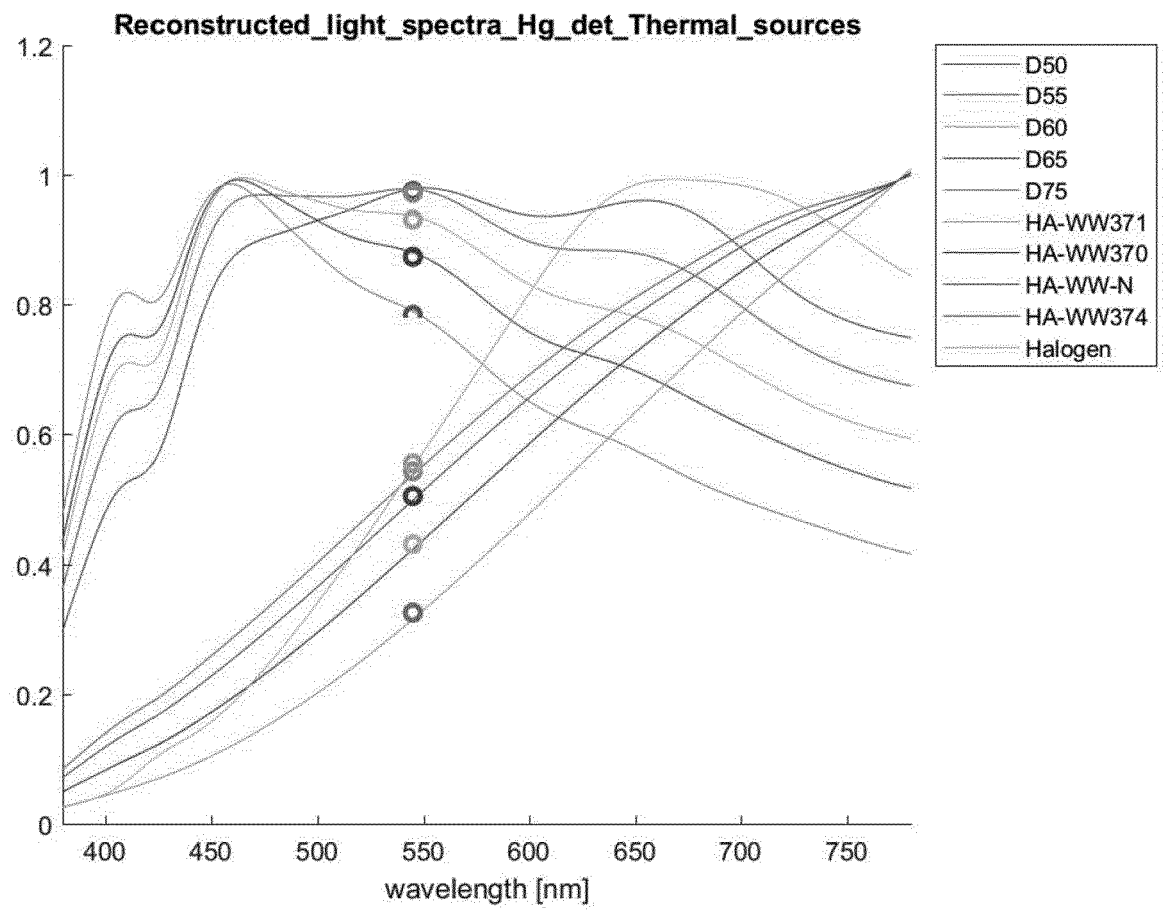
FIG. 29 depicts example reconstructed spectra of FIG. 24 relative to the spectral response of the Hg channel.

For example, FIG. 29 depicts examples reconstructed spectra of thermal sources. It can be seen that a spectral response of the Hg channel at wavelengths of the Hg band, e.g. around 545 nanomtres, are generally similar to corresponding reconstructed responses.

Figure 31:
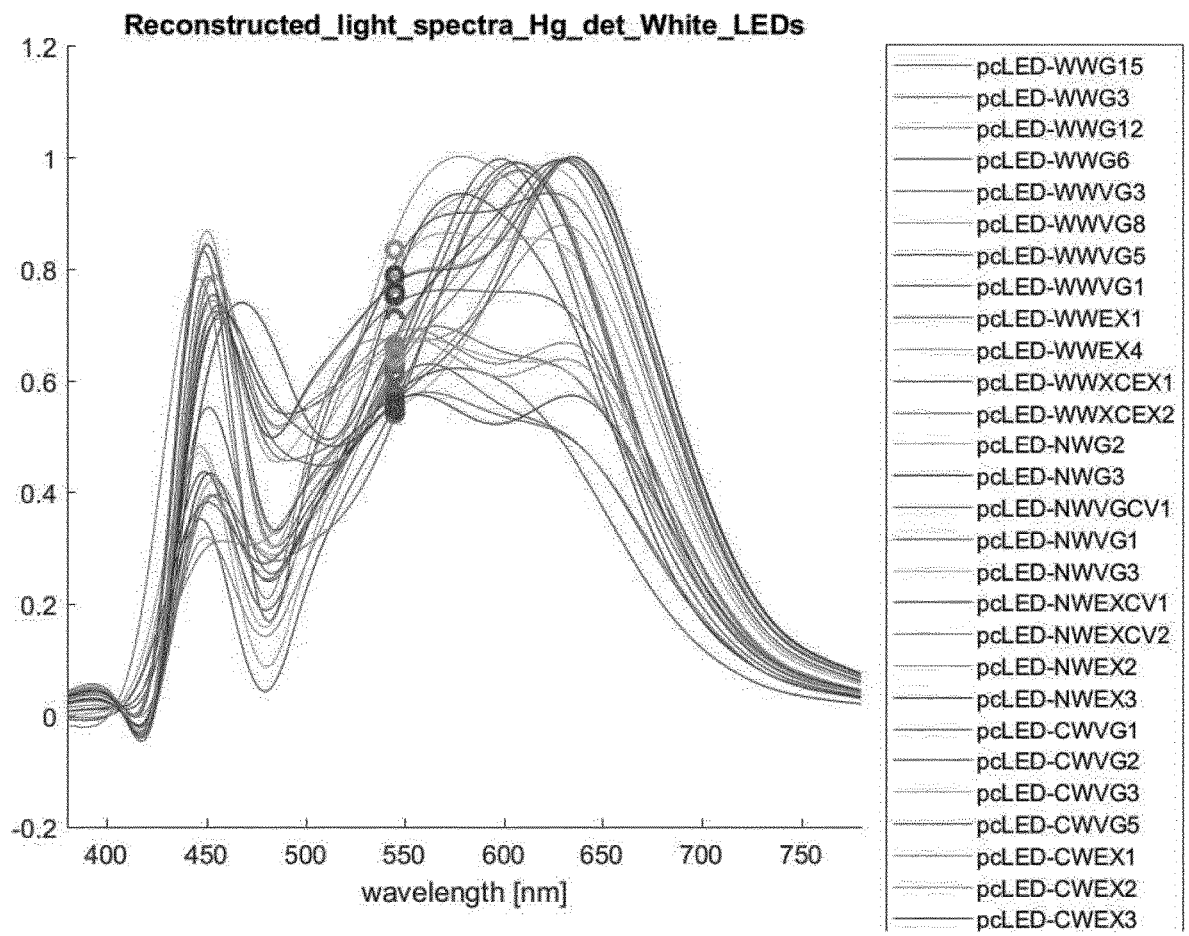
FIG. 31 depicts example reconstructed spectra of FIG. 26 relative to the spectral response of the Hg channel.
Figure 32:
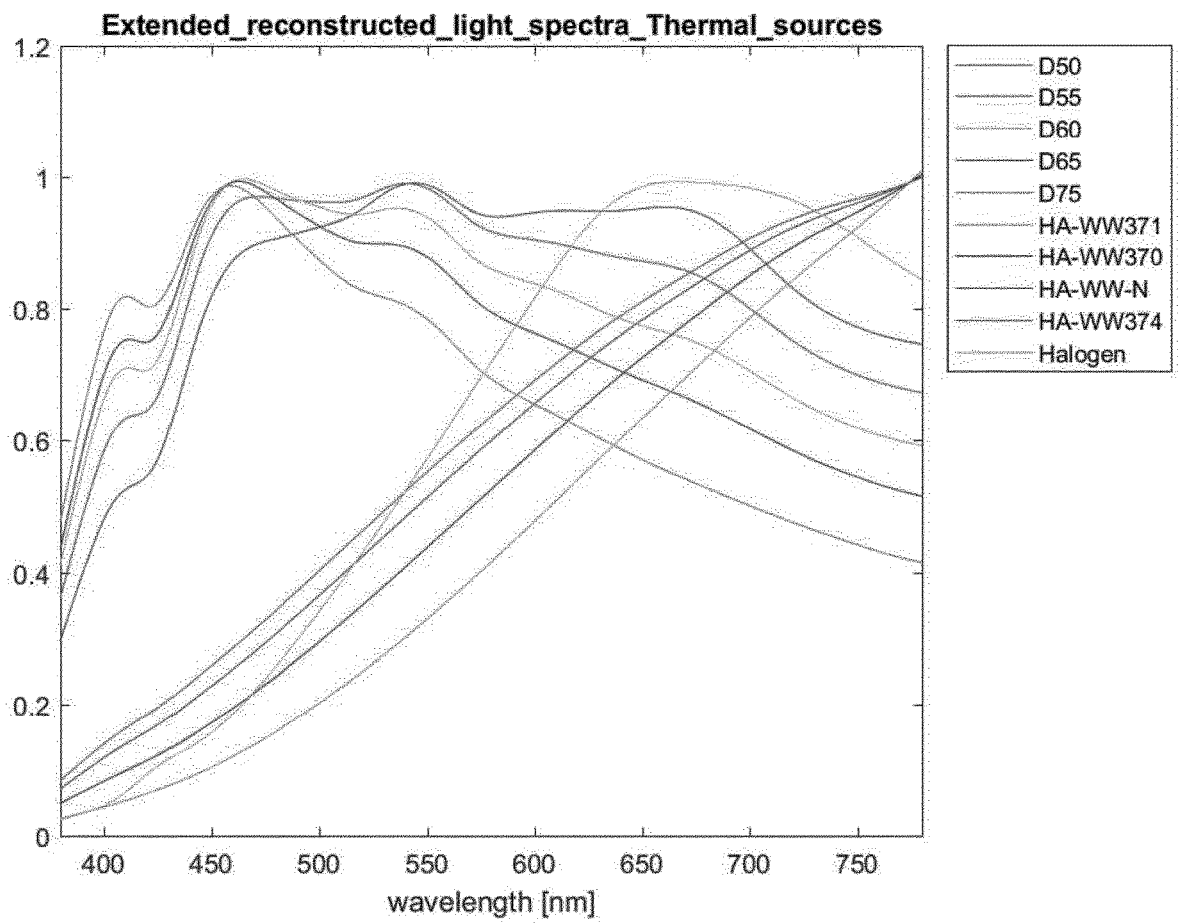
FIG. 32 depicts example reconstructed spectra corresponding to the range of different thermal light sources of FIG. 21, made using all channels including the Hg channel.
Figure 33:
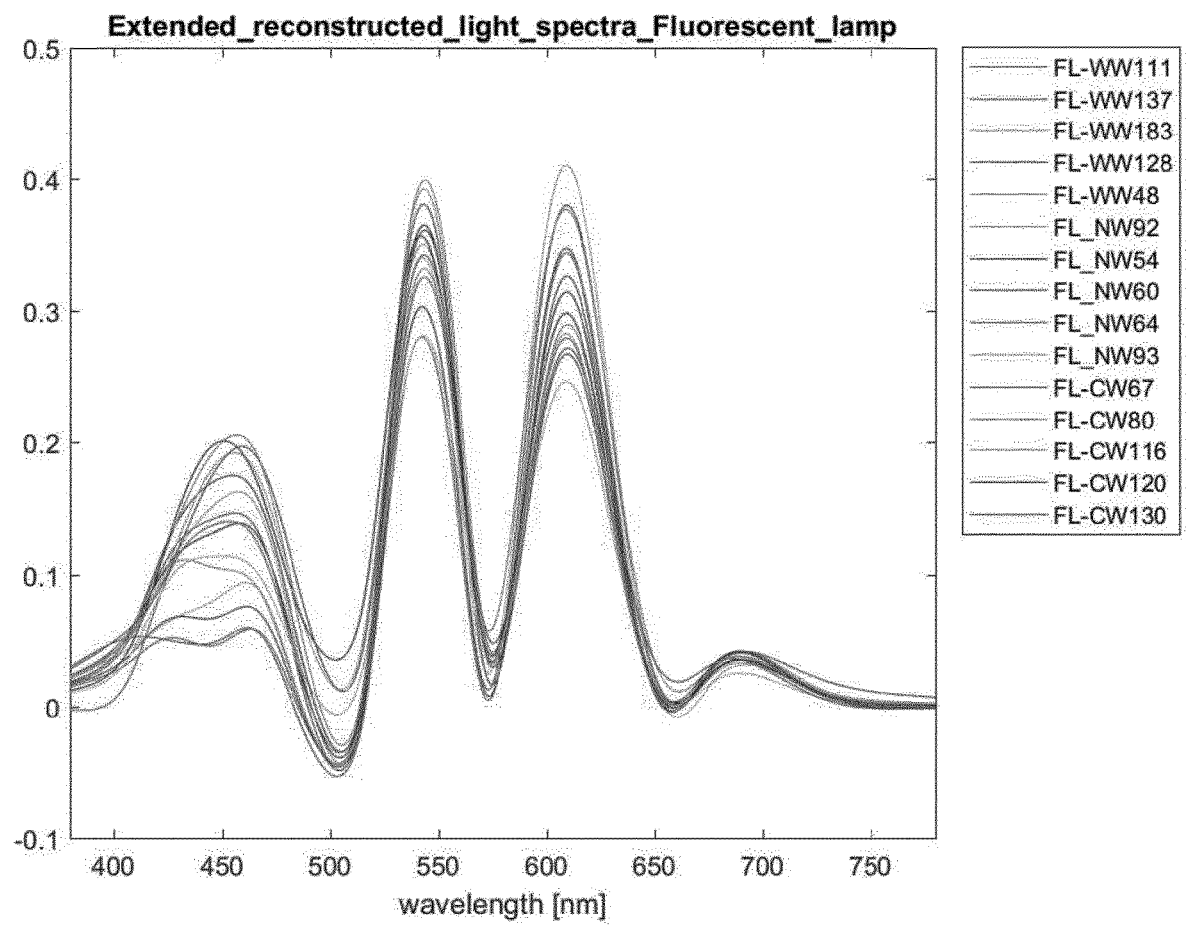
FIG. 33 depicts example reconstructed spectra corresponding to the range of different fluorescent light sources of FIG. 22, made using all channels including the Hg channel.
Figure 34:
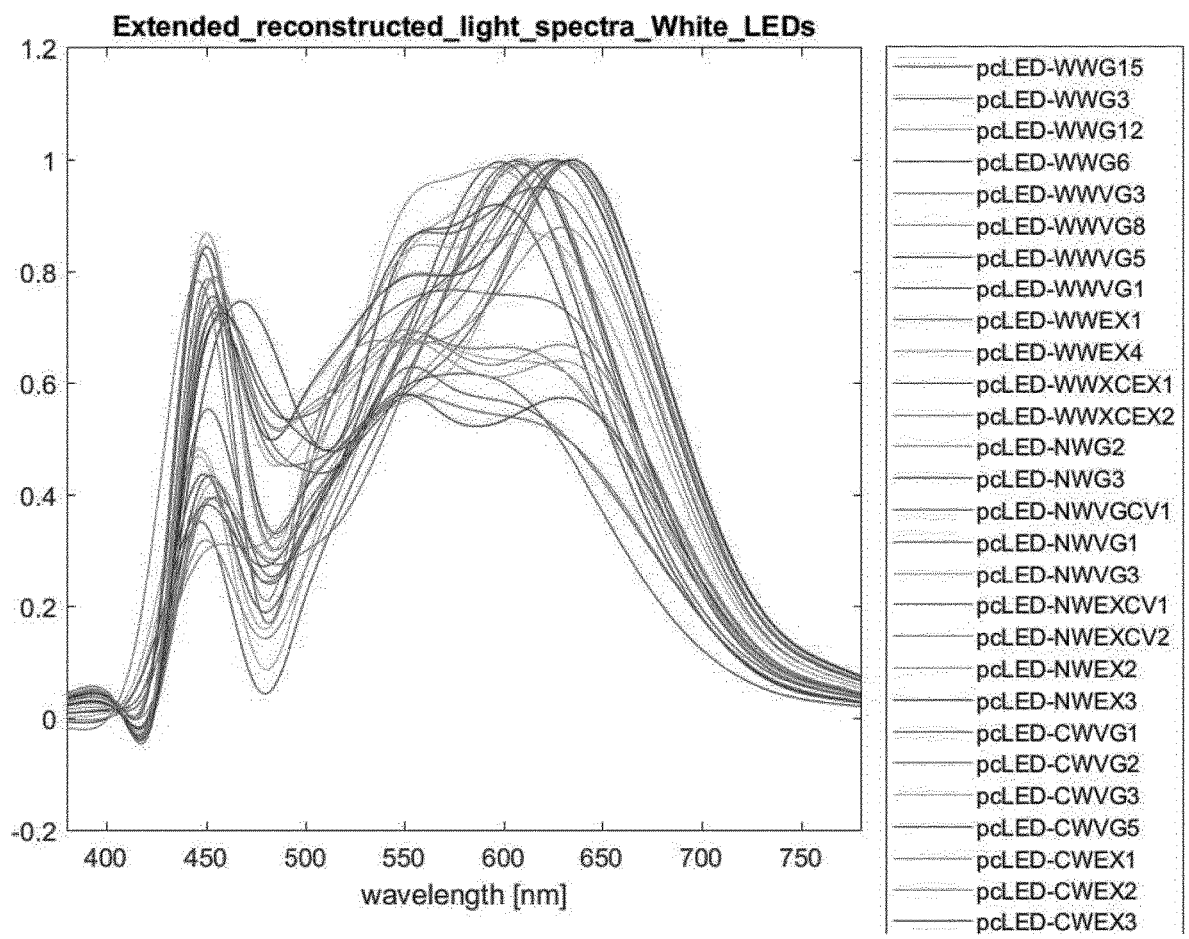
FIG. 34 depicts example reconstructed spectra corresponding to the range of different white LEDs of FIG. 23, made using all channels including the Hg channel.

This is also the case for reconstructed spectra of different white LEDs relative to the spectral response of the Hg channel at wavelengths of the Hg band, as depicted in FIG. 31.

Figure 30:
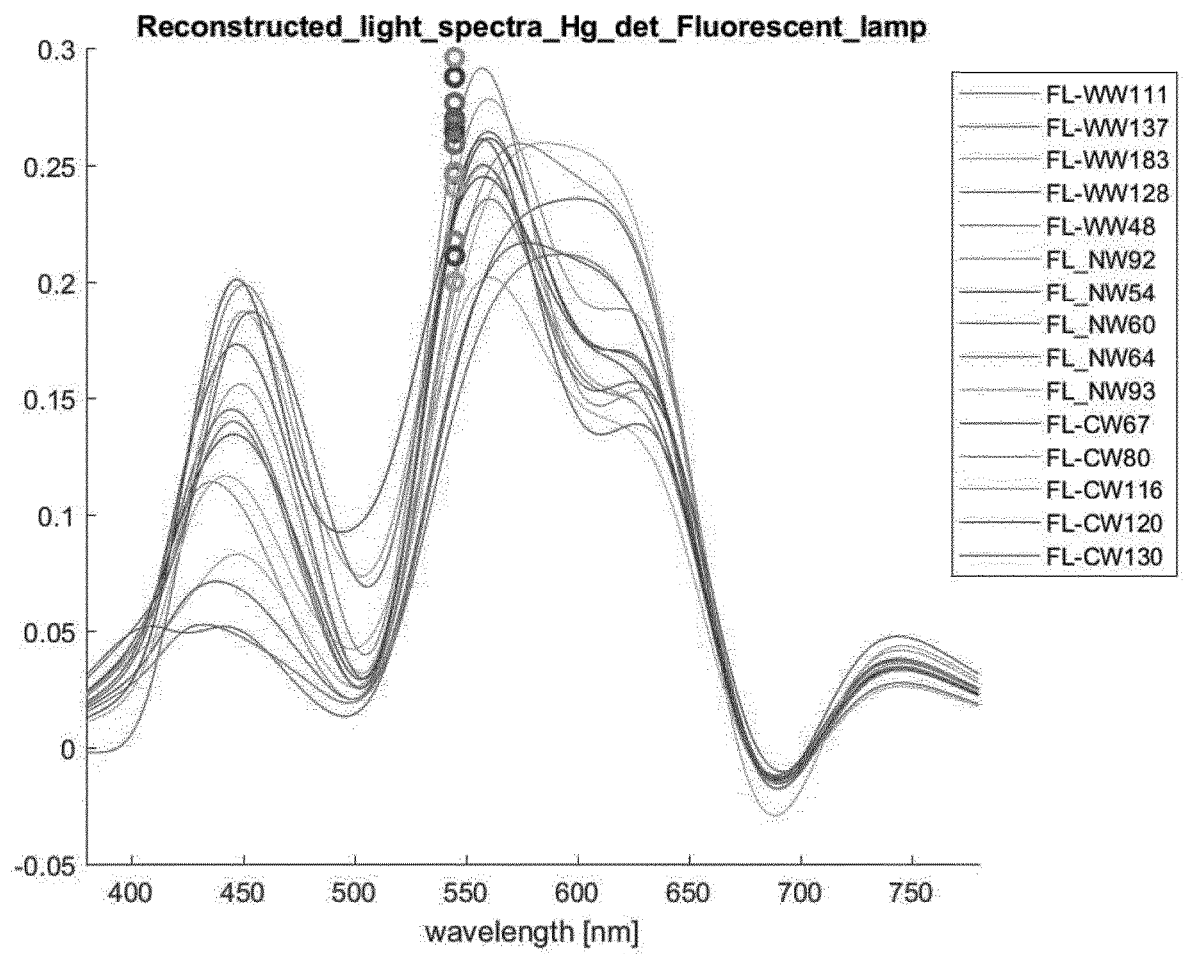
FIG. 30 depicts example reconstructed spectra of FIG. 25 relative to the spectral response of the Hg channel.

However, it can be seen from FIG. 30 that at wavelengths corresponding to the Hg band as approximately 545 nanometers, the reconstructed spectra of various fluorescent light sources differs substantially from the response of the Hg channel.

In some embodiments, a detection of a fluorescent light source may be performed by determining a ratio of the signal of the Hg channel to the reconstructed spectra power, at a centroid wavelength of the Hg channel, e.g. at 545 nanometers. For example, a ratio close to 1 may indicate that no fluorescent light source is present.

In some embodiments, a direct comparison may alternatively or additionally be made to neighboring channels. For example, a ratio between the response of the Hg channel and the "Y-channel" and/or the "F_514_40" channel as depicted in FIG. 28, may be performed to determine a presence of a fluorescent light source. Such a detection may be less robust than the above-described method of comparing the spectral response of the Hg channel to the reconstructed spectra.

In another method of detecting and/or identifying a fluorescent light source, a spectral reconstruction using all relevant channels of the multi-spectral sensor including the Hg channel, as depicted in FIGS. 31 to 34, may be performed.

That is, by using the Hg channel in the spectra reconstruction matrix, the reconstruction may be become more sensitive to the Hg bands. For non-characteristic spectra, such as thermal lights and white LEDs, the reconstruction will not be affected by inclusion of the Hg channel.

Furthermore, a higher quality of spectral reconstruction that may be achieved by inclusion of the Hg channel may also be used directly in further spectra analysis. The Applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the disclosure may consist of any such individual feature or combination of features. In view of the foregoing description it will be evident to a person skilled in the art that various modifications may be made within the scope of the disclosure.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

LIST OF REFERENCE NUMERALS

1900 electronic device
1910 display
1920 integrated radiation sensor
1930 control circuitry
1950 camera
1970 integrated radiation sensor
1980 control circuitry
2010 step
2020 step
2030 step
2700 passband

The invention claimed is:

1. An integrated radiation sensor for color matching functions, the sensor comprising:
 a plurality of color matching channels, each color matching channel comprising a radiation sensing element and an associated optical filter defining a spectral sensitivity profile corresponding to a color matching function,
 a plurality of compensation channels comprising more than two compensation channels, each compensation channel comprising a radiation sensing element and an associated optical filter defining a spectral sensitivity profile for use in compensating a color sensed by the color matching channels, wherein the spectral sensitivity profile of each compensation channel substantially corresponds to a mean of an upper offset spectra and a lower offset spectra,
 wherein the upper offset spectra corresponds to a spectral sensitivity profile of a typical color matching channel increased by a fixed offset in wavelength and the lower offset spectra corresponds to the spectral sensitivity profile of the typical color matching channel decreased by the fixed offset in wavelength.

2. The integrated radiation sensor of claim 1, wherein the fixed offset in wavelength is +/−1%.

3. The integrated radiation sensor of claim 1 wherein the compensation channels comprise spectral sensitivity profiles substantially conforming to a Gaussian or Cosine shape.

4. The integrated radiation sensor of claim 1, wherein the spectral sensitivity profile of each color matching channel corresponds to a component of a CIE standard observer color matching function.

5. The integrated radiation sensor of claim 1, wherein the spectral sensitivity profile of each color matching channel corresponds to a component of a CIE XYZ color space.

6. The integrated radiation sensor of claim 1 wherein the spectral sensitivity profiles of the plurality of channels collectively spans substantially all of the visible range of the electromagnetic spectrum.

7. The integrated radiation sensor of claim 1 comprising:
 at least one further channel having a spectral sensitivity profile in a visible range of the electromagnetic spectrum; or
 at least one further channel having a spectral sensitivity profile in an infrared range of the electromagnetic spectrum;/or
 at least one further channel having a spectral sensitivity profile in an ultraviolet range of the electromagnetic spectrum.

8. The integrated radiation sensor of claim 1 comprising: at least three color matching channels; and at least 4 compensation channels.

9. The integrated radiation sensor of claim 1 wherein the compensation channels comprise spectral sensitivity profiles having a peak wavelength and/or FWMH that is substantially different from a peak wavelength or FWMH of the spectral sensitivity profile of any of the color matching channels.

10. The integrated radiation sensor of claim 1, wherein the spectral sensitivity profile of a typical color matching channel corresponds to a spectral sensitivity profile of an ideal color matching channel.

11. The integrated radiation sensor of claim 1, comprising a further channel, the further channel comprising a radiation sensing element and an associated optical filter having a passband corresponding to a peak in an emission spectrum of mercury in the visible light range.

12. The integrated radiation sensor of claim 11, wherein the passband is centered at approximately 545 nanometers.

13. The integrated radiation sensor of claim 11, wherein the passband has a width of approximately 10 nanometers.

14. An electronic device comprising:
 a display that displays images for a user;
 an integrated radiation sensor according to claim 1; and
 control circuitry coupled to the display and the integrated radiation sensor,
 wherein the control circuitry is configured to determine a color of light incident upon the radiation sensor based upon at least one signal from the integrated radiation sensor, and
 wherein the control circuitry is configured to adjust the display based at least in part on a determined color.

15. The electronic device of claim 14, comprising a memory storing a calibration matrix for calibrating data corresponding radiation sensed by the integrated radiation sensor.

16. The electronic device of claim 14, wherein the device is one of: a cellular telephone, a camera, an image-recording device; or a video recording device.

17. A camera comprising an integrated radiation sensor according to claim 1, and control circuitry configured to determine a color of light incident upon the radiation sensor based upon at least one signal from the integrated radiation sensor.

18. A method of calibrating the integrated radiation sensor of claim 1, the method comprising:
- exposing the sensor to incident radiation from a known source of radiation;
- generating a sensitivity matrix corresponding to the incident radiation sensed by each of the plurality of channels of the sensor; and
- generating and storing a calibration matrix corresponding to the sensitivity matrix adapted for a color matching function.

19. The method of claim 18, where the step of exposing the sensor to radiation comprises performing a monochromatic sweep test, or exposing the sensor to multiple light sources.

20. A method of using the integrated sensor of claim 1 for spectral reconstruction or for a color matching function and/or for detection of a fluorescent light source.

\* \* \* \* \*